(12) United States Patent
Kaneko

(10) Patent No.: US 12,129,531 B2
(45) Date of Patent: *Oct. 29, 2024

(54) ALUMINUM ALLOY, AND CONDUCTIVE MEMBER, BATTERY MEMBER, FASTENING COMPONENT, SPRING COMPONENT, STRUCTURAL COMPONENT AND CABTIRE CABLE USING SAME

(71) Applicant: FURUKAWA ELECTRIC CO., LTD., Tokyo (JP)

(72) Inventor: Hiroshi Kaneko, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 619 days.

This patent is subject to a terminal disclaimer.

(21) Appl. No.: 17/427,489

(22) PCT Filed: Jan. 27, 2020

(86) PCT No.: PCT/JP2020/002833
§ 371 (c)(1),
(2) Date: Jul. 30, 2021

(87) PCT Pub. No.: WO2020/158683
PCT Pub. Date: Aug. 6, 2020

(65) Prior Publication Data
US 2022/0010411 A1     Jan. 13, 2022

(30) Foreign Application Priority Data
Jan. 31, 2019    (JP) ................................ 2019-016304

(51) Int. Cl.
| | |
|---|---|
| C22C 21/08 | (2006.01) |
| C22C 21/02 | (2006.01) |
| C22F 1/043 | (2006.01) |
| C22F 1/047 | (2006.01) |
| C22F 1/05 | (2006.01) |

(52) U.S. Cl.
CPC ............. C22C 21/08 (2013.01); C22C 21/02 (2013.01); C22F 1/043 (2013.01); C22F 1/047 (2013.01); C22F 1/05 (2013.01)

(58) Field of Classification Search
CPC .................................. C22C 21/06; C22F 1/047
See application file for complete search history.

(56) References Cited

U.S. PATENT DOCUMENTS

| | | |
|---|---|---|
| 5,826,456 A | 10/1998 | Kawazoe et al. |
| 2017/0253954 A1 | 9/2017 | Yoshida et al. |
| 2019/0127826 A1 | 5/2019 | Kaneko et al. |
| 2019/0136351 A1 | 5/2019 | Kaneko et al. |
| 2019/0368008 A1 | 12/2019 | Araki et al. |
| 2020/0040432 A1 | 2/2020 | Kaneko |
| 2021/0010110 A1 | 1/2021 | Kaneko |

FOREIGN PATENT DOCUMENTS

| | | |
|---|---|---|
| CN | 107002183 A | 8/2017 |
| CN | 108699641 A | 10/2018 |
| CN | 109072351 A | 12/2018 |
| CN | 109072355 A | 12/2018 |
| EP | 3 486 341 A1 | 5/2019 |
| EP | 3 604 580 A1 | 2/2020 |
| EP | 3 778 947 A1 | 2/2021 |
| JP | 5-331585 A | 12/1993 |
| JP | 9-137244 A | 5/1997 |
| JP | 2001-131721 A | 5/2001 |
| JP | 2003-27172 A | 1/2003 |
| JP | 2004-134212 A | 4/2004 |
| JP | 2010-159445 A | 7/2010 |
| KR | 10-2000-0022514 | 4/2000 |
| WO | WO 2016/088889 A1 | 6/2016 |
| WO | WO 2018/012482 A1 | 1/2018 |
| WO | WO 2018/155531 A1 | 8/2018 |
| WO | WO 2018/181505 A1 | 10/2018 |
| WO | WO 2019/188452 A1 | 10/2019 |

OTHER PUBLICATIONS

Extended European Search Report issued Sep. 6, 2022 in European Patent Application No. 20748062.5, 9 pages.
Combined Chinese Office Action and Search Report issued Dec. 2, 2021 in Chinese Patent Application No. 202080006203.5 (with English translation), 14 pages.
International Search Report issued on Apr. 14, 2020 in PCT/JP2020/002833 filed on Jan. 27, 2020, 2 pages.
Notice of Reasons for Refusal issued on Sep. 15, 2020 in Japanese Patent Application No. 2020-528069 (with unedited computer-generated English translation), 5 pages.

(Continued)

*Primary Examiner* — Jessee R Roe
(74) *Attorney, Agent, or Firm* — Oblon, McClelland, Maier & Neustadt, L.L.P.

(57) ABSTRACT

An aluminum alloy that has high yield strength enabling use as a substitute for iron- and copper-based metal materials, and has a constant break elongation even at narrow diameters. The aluminum alloy has an alloy composition containing 0.20-1.80 mass % of Mg, 0.20-2.00 mass % of Si, and 0.01-1.50 mass % of Fe, with a balance being Al and inevitable impurities. The aluminum alloy material has a fibrous metallic microstructure in which a plurality of crystal grains extend so as to be aligned in one direction, and in a cross section parallel to the one direction, an average value of a maximum dimension in a direction perpendicular to the longitudinal direction of a plurality of the crystal grains is no more than 400 nm, and viewing the cross section in a thickness direction, when observing at a central part, specific voids having a maximum dimension in a direction perpendicular to the longitudinal direction of no less than 1.0 μm are not present, or an existence number of the specific voids is no more than 15 per 10000 μm².

19 Claims, 7 Drawing Sheets

(56) References Cited

OTHER PUBLICATIONS

Korean Office Action issued Jan. 30, 2023 in KR Patent Application No. 10-2021-7012386 (with unedited computer-generated English translation), 11 pages.
Chinese Office Action issued Mar. 28, 2022 in Chinese Patent Application No. 202080006203.5 (with English machine translation), 12 pages.

LONGITUDINAL DIRECTION X

ALUMINUM ALLOY, AND CONDUCTIVE MEMBER, BATTERY MEMBER, FASTENING COMPONENT, SPRING COMPONENT, STRUCTURAL COMPONENT AND CABTIRE CABLE USING SAME

TECHNICAL FIELD

The present invention relates to an aluminum alloy material, and particularly to an aluminum alloy material having a high strength and excellent workability. Such an aluminum alloy material can be used in extensive applications (for example, conductive members, battery members, fastening components, spring components, structural components, cabtire cables, etc.).

BACKGROUND ART

In recent years, technology is being developed for shaping a three-dimensional structure by a method such as twisting, knitting, weaving, tying, linking and connecting fine wires made of metal. With such a method, the consideration as a Wire-Woven Cellular Materials has been advancing, and application to components for batteries, heatsinks, shock absorbing members, etc. is expected.

In addition, as a fine wire made of the above such metal, although iron-based and copper-based wire materials have come to be widely used, recently, alternatives to aluminum-based materials are being considered which, compared to iron-based and copper-based metallic materials, in addition to having low specific gravity, and further having a large thermal expansion coefficient, have relatively good the electrical and thermal conductivity, are superior in corrosion resistance, have a particularly small elastic modulus, and elastically deforms flexibly.

However, a pure aluminum material has had a problem in that the yield strength (refers to stress which starts plastic deformation when loading stress on the material, also called yield stress) is low compared to an iron-based or copper-based metal material. Among aluminum alloys, 2000 series (Al—Cu system) or 7000 series (Al—Zn—Mg system) have relatively high yield strength; however, the electrical conductivity, corrosion resistance, stress corrosion cracking resistance, workability, etc. are not sufficient.

For this reason, recently, a 6000-series (Al—Mg—Si series) aluminum alloy material containing Mg and Si and superior in electrical and thermal conductivity, and corrosion resistance has been widely used. However, since the yield strength of such a 6000-series aluminum alloy material is not sufficient, further high strengthening has been desired.

As a method of enhancing strength of such an aluminum alloy material, known are a method by crystallization of an aluminum alloy material having an amorphous phase (Patent Document 1), a fine crystal grain formation method by the ECAP method (Patent Document 2), a fine crystal grain formation method by conducting cold working at temperature no higher than room temperature (Patent Document 3), a method of dispersing carbon nanofibers (Patent Document 4), etc. However, with these methods, the size of any aluminum alloy material produced is small, and thus industrial implementation has been difficult.

In addition, Patent Document 5 discloses a method of obtaining an Al—Mg-based alloy having a fine structure by control of the rolling temperature. This method excels in industrial mass productivity, but has a problem in further strength enhancement of the obtained Al—Mg based alloy.

In addition, in the case of the cross-sectional area of the material being small, the break elongation of the material generally declines. As one example, the break elongation of an annealed copper wire will be explained. The yield strength of the annealed copper wire is mostly constant depending on the wire diameter. The annealed copper wire is one material having the highest break elongation among all metallic materials. Table 1 below shows the relationship of the wire diameter of the annealed copper wire and lower limit value of break elongation, citing from ASTM International B3-13 "Standard Specification for Soft or Annealed Copper Wire".

TABLE 1

| Diameter (mm) | Elongation 10 in. (254 mm), % min |
|---|---|
| 11.684 | 35 |
| 10.404 | 35 |
| 9.266 | 35 |
| 8.252 | 35 |
| 7.348 | 30 |
| 6.543 | 30 |
| 5.827 | 30 |
| 5.189 | 30 |
| 4.620 | 30 |
| 4.115 | 30 |
| 3.665 | 30 |
| 3.264 | 30 |
| 2.906 | 30 |
| 2.588 | 25 |
| 2.304 | 25 |
| 2.052 | 25 |
| 1.829 | 25 |
| 1.628 | 25 |
| 1.450 | 25 |
| 1.290 | 25 |
| 1.151 | 25 |
| 1.024 | 25 |
| 0.912 | 25 |
| 0.813 | 25 |
| 0.724 | 25 |
| 0.643 | 25 |
| 0.574 | 25 |
| 0.511 | 20 |
| 0.455 | 20 |
| 0.404 | 20 |
| 0.361 | 20 |
| 0.320 | 20 |
| 0.287 | 20 |
| 0.254 | 15 |
| 0.226 | 15 |
| 0.203 | 15 |
| 0.180 | 15 |
| 0.160 | 15 |
| 0.142 | 15 |
| 0.127 | 15 |
| 0.114 | 15 |
| 0.102 | 15 |
| 0.089 | 15 |
| 0.079 | 15 |

As understood from this Table 1, the control value for break elongation is high at 35% with a wire diameter of at least 8.252 mm; whereas, it is smaller with finer wire diameter at 30% with wire diameter of 2.906 mm to 7.348 mm, 25% with a wire diameter of 0.574 mm to 2.588 mm, at 20% with a wire diameter of 0.287 mm to 0.511 mm, and at 15% with a wire diameter of 0.079 mm to 0.254 mm. In particular, with a wire diameter no more than 1 mm, the decline in break elongation accompanying a diameter reduction is pronounced. Therefore, in a fine wire diameter such as that no more than 1 mm, for example, it has been demanded to raise the break elongation.

In addition, as a fine wire for molding a three-dimensional structure such as that mentioned above, for example, in the case of using an aluminum alloy material, it has been desired to improve both the yield strength and break elongation. However, this break elongation and yield strength are characteristics which usually contradictory, and thus it is not easy to improve both the yield strength and break elongation.

Patent Document 1: Japanese Unexamined Patent Application, Publication No. H05-331585
Patent Document 2: Japanese Unexamined Patent Application, Publication No. H09-137244
Patent Document 3: Japanese Unexamined Patent Application, Publication No. 2001-131721
Patent Document 4: Japanese Unexamined Patent Application, Publication No. 2010-159445
Patent Document 5: Japanese Unexamined Patent Application, Publication No. 2003-027172

DISCLOSURE OF THE INVENTION

Problems to be Solved by the Invention

The present invention has an object of providing an aluminum alloy that has high yield strength enabling use as a substitute for iron-based and copper-based metal materials, and has a constant break elongation even at narrow diameters, as well as conductive members, battery members, fastening components, spring components, structural components and cabtire cables made using this.

Means for Solving the Problems

The present inventors, as a result of diligent research, found that an aluminum alloy material that combines high yield strength comparable to iron-based and copper-based metallic materials, and excellent break elongation could be obtained by the aluminum alloy material having a predetermined alloy composition, and having a fibrous metallic microstructure in which crystal grains extend so as to be aligned in one direction, an average value of a maximum dimension in a direction perpendicular to the longitudinal direction of the crystal grains in a cross section parallel to the one direction is no more than 400 nm, and viewing the cross section in a thickness direction, when observing at a central part, specific voids having a maximum dimension in a direction perpendicular to the longitudinal direction of at least 1.0 μm are not present, or an existence number of the specific voids is no more than 15 per 10000 μm$^2$, and based on such knowledge, arrived at completion of the present invention.

In other words, the essential structure of the present invention is as follows. An aluminum alloy material according to a first aspect of the present invention contains an alloy composition containing 0.20 to 1.80 mass % of Mg, 0.20 to 2.00 mass % of Si, and 0.01 to 1.50 mass % of Fe, with a balance being Al and inevitable impurities, wherein the aluminum alloy material has a fibrous metallic microstructure in which a plurality of crystal grains extend so as to be aligned in one direction, and wherein, in a cross section parallel to the one direction, an average value of a maximum dimension in a direction perpendicular to the longitudinal direction of a plurality of the crystal grains is no more than 400 nm, and viewing the cross section in a thickness direction, when observing at a central part, specific voids having a maximum dimension in a direction perpendicular to the longitudinal direction of no less than 1.0 μm are not present, or an existence number of the specific voids is no more than 15 per 10000 μm$^2$. An aluminum alloy material according to a second aspect of the present invention includes an alloy composition containing 0.20 to 1.80 mass % of Mg, 0.20 to 2.00 mass % of Si, 0.01 to 1.50 mass % of Fe, and no more than 2.00 mass % in total of at least one element(s) selected from a group consisting of RE, Cu, Ag, Zn, Ni, Co, Au, Mn, Cr, V, Zr, Sn, Ti and B, with a balance being Al and inevitable impurities, wherein the aluminum alloy material has a fibrous metallic microstructure in which a plurality of crystal grains extend so as to be aligned in one direction, and wherein, in a cross section parallel to the one direction, an average value of a maximum dimension in a direction perpendicular to the longitudinal direction of a plurality of the crystal grains is no more than 400 nm, and viewing the cross section in a thickness direction, when observing at a central part, specific voids having a maximum dimension in a direction perpendicular to the longitudinal direction of no less than 1.0 μm are not present, or an existence number of the specific voids is no more than 15 per 10000 μm$^2$. According to a third aspect of the present invention, in the aluminum alloy material as described in the first or second aspect, the average value of the maximum dimension in the direction perpendicular to the longitudinal direction of the plurality of the specific voids is 4 to 15, relative to the average value of the maximum dimension in the direction perpendicular to the longitudinal direction of the plurality of the crystal grains. According to a fourth aspect of the present invention, in the aluminum alloy material as described in any one of the first to third aspects, a surface is coated with at least one metal(s) selected from the group consisting of Cu, Ni, Ag, Sn, Au, Pd and Pt. A conductive member according to a fifth aspect of the present invention includes the aluminum alloy material as described in any one of the first to fourth aspects. A battery member according to a sixth aspect of the present invention includes the aluminum alloy material as described in any one of the first to fourth aspects. A fastening component according to a seventh aspect of the present invention includes the aluminum alloy material as described in any one of the first to fourth aspects. A spring component according to an eighth aspect of the present invention includes the aluminum alloy material as described in any one of the first to fourth aspects. A structural component according to a ninth aspect of the present invention includes the aluminum alloy material as described in any one of the first to fourth aspects. A cabtire cable according to a tenth aspect of the present invention includes the aluminum alloy material as described in any one of the first to fourth aspects.

Effects of the Invention

According to the present invention, an aluminum alloy material that combines high yield strength comparable to iron-based and copper-based metallic materials, and constant break elongation even with a narrow diameter, as well as conductive members, battery members, fastening components, spring components, structural components and cabtire cables made using this can be obtained by the aluminum alloy material having a predetermined alloy composition, and having a fibrous metallic microstructure in which a plurality of crystal grains extend so as to be aligned in one direction, an average value of a maximum dimension in a direction perpendicular to the longitudinal direction of the plurality of crystal grains in a cross section parallel to the one direction is no more than 400 nm, and viewing the cross section in a thickness direction, when observing at a central part, specific voids having a maximum dimension in a direction perpendicular to the longitudinal direction of at least 1.0 μm are not present, or an existence number of the specific voids is no more than 15 per 10000 μm².

PREFERRED MODE FOR CARRYING OUT THE INVENTION

Hereinafter, a preferred embodiment of an aluminum alloy material of the present invention will be explained in detail. The aluminum alloy material according to the present invention is an aluminum alloy material having an alloy composition containing 0.20 to 1.80 mass % of Mg, 0.20 to 2.00 mass % of Si and 0.01 to 1.50 mass % of Fe, and further having no more than 2.00 mass % in total of at least one selected from the group consisting of RE, Cu, Ag, Zn, Ni, Co, Au, Mn, Cr, V, Zr, Sn, Ti and B as necessary, and a balance of Al and inevitable impurities, and having a fibrous alloy microstructure in which a plurality of crystal grains extend so as to be aligned in one direction, and an average value of a maximum dimension in a direction perpendicular to the longitudinal direction of the plurality of crystal grains in a cross section parallel to the one direction is no more than 400 nm, and viewing the cross section in a thickness direction, when observing at a central part, specific voids having a maximum dimension in a direction perpendicular to the longitudinal direction of at least 1.0 μm are not present, or an existence number of the specific voids is no more than 15 per 10000 μm².

Herein, in the present disclosure, "crystal grain" refers to a portion surrounded by an orientation difference boundary. Herein, "orientation difference boundary" refers to the boundary at which the contrast (channeling contrast) discontinuously changes, in the case of observing a metal microstructure using a transmission electron microscope (TEM), scanning transmission electron microscope (STEM), scanning ion microscope (SIM) or the like. In addition, the maximum dimension in a direction perpendicular to the longitudinal direction of the crystal grain corresponds to the maximum among the intervals in the orientation difference boundary.

In addition, in the present disclosure, in the case of cutting the aluminum alloy material in a specific direction, "cross section" refers to the exposed cut surface.

Furthermore, in the present disclosure, "processing direction" refers to running direction of elongation processing (wire drawing, rolling). For example, in the case of the aluminum alloy material being a wire rod, the longitudinal direction of the wire rod (direction perpendicular to wire diameter) corresponds to the wire drawing direction. In addition, in the case of the aluminum alloy material being a plate, the longitudinal direction in a state as strip processed corresponds to the rolling direction. It should be noted that, in the case of a plate, it may be cut and fragmented into a predetermined size after strip processed; however, in this case, although the longitudinal direction after cutting is not necessarily equal to the processing direction, even in this case, it is possible to confirm the rolling direction from the processed face of the plate surface.

Figure 1:
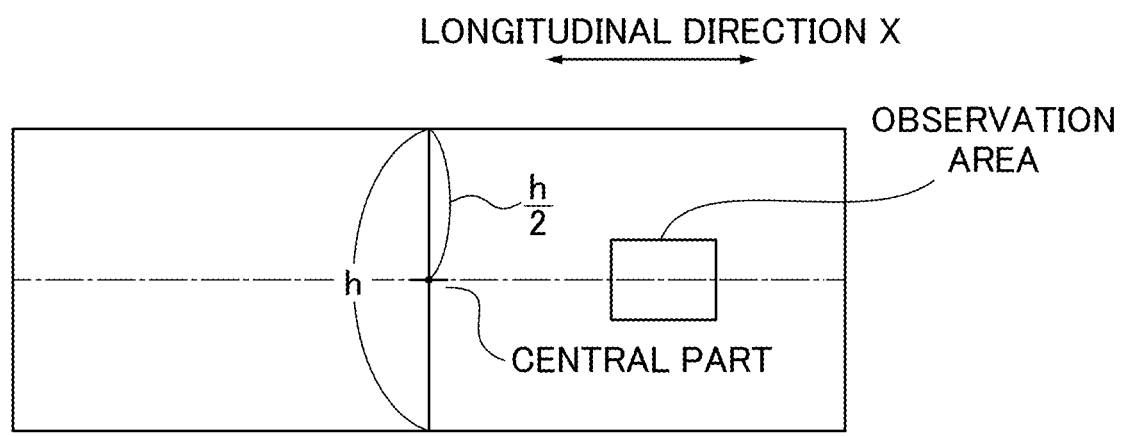
FIG. 1 is a drawing for explaining a "central part"

Then, in the present disclosure, "thickness direction" refers to a wire diameter direction in the case of the aluminum alloy material being a wire rod, and refers to a thickness direction in the case of the aluminum alloy material being a plate. Herein, a view for explaining "central part" is shown in FIG. 1. FIG. 1 shows a cross section of the aluminum alloy material having a processing direction in the left/right direction of the paper plane. It should be noted that, as the shape of the aluminum alloy material, a wire rod and plate can be exemplified, for example; however, a cross section parallel to the processing direction is as in FIG. 1, even if either shape. As shown in FIG. 1, this aluminum alloy material has a rectangular cross section of thickness h. In such a plate, "central part" refers to a portion centered around a position moved in the thickness direction by a dimension h/2 which is one half of the plate thickness h from the plate surface. Then, in the cross section shown in the above FIG. 1, in a range of 10,000 μm' including the "central part" (observation field of view (observation range): longitudinal direction (98 to 148 μm)×thickness direction (73 to 110 μm)), the number of specific voids in which the maximum dimension in a direction perpendicular to the longitudinal direction included therein is at least 1.0 μm is obtained. Similar observation is carried out in a total of 5 randomly selected fields of view, and the average value for the number of specific voids is obtained. The average value for the number of specific voids obtained in this way is defined as "existing number of specific voids".

Figure 2:
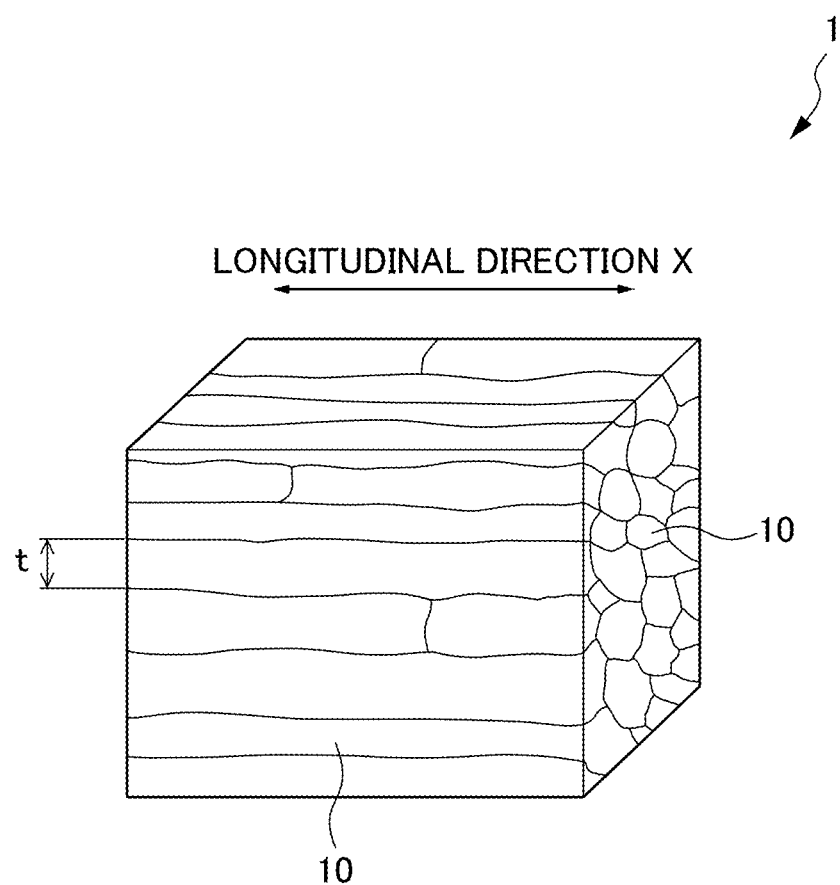
FIG. 2 is a perspective view schematically showing an aspect of the metal microstructure of an aluminum alloy material according to the present invention.

The aluminum alloy material according to the present invention has a fibrous metal microstructure in which multiple crystal grains extend aligning in one direction. Herein, a perspective view schematically showing an aspect of the metallic microstructure of the aluminum alloy material according to the present invention is shown in FIG. 2. As shown in this FIG. 2, the aluminum alloy material of the present invention has a fibrous microstructure in which the plurality of elongated crystal grains 10 are in an extended state aligned in one direction, i.e. the longitudinal direction X in FIG. 2. Crystal grains of such elongated shape greatly differ from the conventional fine crystal grains, and flat crystal grains simply having large aspect ratio. In other words, the crystal grains of the present invention are an elongated shape such as fibers, and the average value of the maximum dimension t in a direction perpendicular to the longitudinal direction X of a plurality of crystal grains is no more than 400 nm. The fibrous metallic microstructure in which such fine crystal grains extend so as to align in one direction is considered as a novel metallic microstructure not existing in a conventional aluminum alloy material.

The aluminum alloy material of the present invention having the above-mentioned metallic microstructure can realize a balance of high strength equivalent to iron-based and copper-based metallic materials (for example, 0.2% yield strength of no less than 380 MPa), and superior break elongation (for example, no less than 2% in the case of the aluminum alloy material being a wire material).

Establishing the crystal grain diameter as fine has an effect, other than raising the strength, which is directly linked to the function of improving intergranular corrosion, function of improving fatigue characteristics relative to repeated deformation, function of decreasing the roughcasting surface of the surface after plastic working, function of decreasing the sagging and burring upon shearing, and raises the performance of the material generally.

Figure 3:
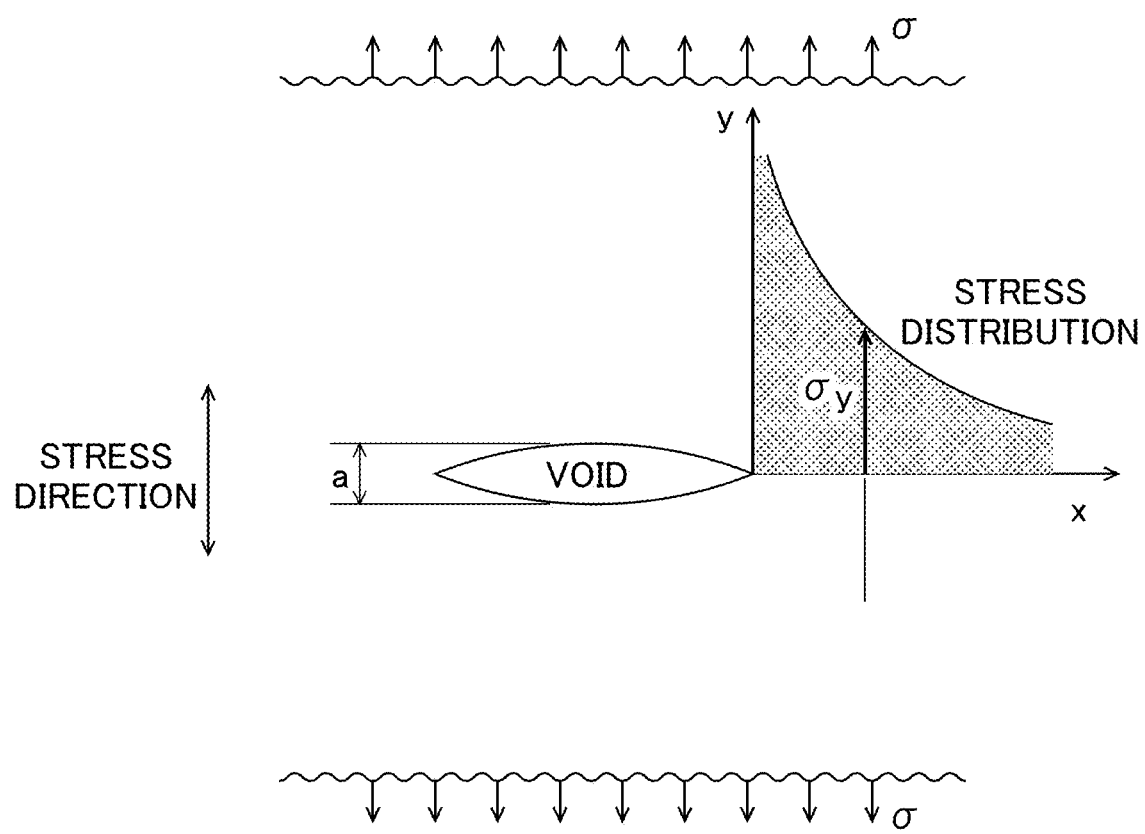
FIG. 3 is a schematic diagram of the stress applied to a void in the aluminum alloy material.

In addition, with the aluminum alloy material according to the present invention, in the case of observing an area of the central part 10000 µm$^2$ of the aluminum alloy material in a cross section thereof, the number of specific voids having the maximum dimension in a direction perpendicular to the longitudinal direction of the crystal grain of at least 1.0 µm is no more than 15. In the aluminum alloy material, when many specific voids having the maximum dimension in a direction perpendicular to the longitudinal direction of at least 1.0 µm exist, the break elongation remarkably declines. FIG. 3 is a schematic view of stress applied to the void (including specific voids) in the aluminum alloy material. When pulling on the aluminum alloy material in the longitudinal direction, the stress focuses at the end thereof, in a void extending in a direction perpendicular to the longitudinal direction. When the maximum dimension (a) in a direction perpendicular to the longitudinal direction of such a void is at least 1.0 µm, the stress applied to the end of the void is particularly large, and becomes the starting point of breakage of the aluminum alloy material.

Decreasing the number of voids has an effect directly connected to a function of improving the electrical and thermal conductivity, a function of improving the malleability such that cracks hardly occur even when receiving hammering treatment or the like, a function of improving twistability, etc., and generally enhancing the function of the material. There are effects/functions beyond merely improving the break elongation.

A material, which exhibits high strength by the fibrous microstructure in which a plurality of crystal grains extend so as to align in one direction interfering with the movement of dislocations, differs from a conventional non-fibrous microstructure, and the mechanism of ductility improvement and the degree of functional effects thereof are entirely different. In the case of having a fibrous metallic microstructure and realizing high strength, the stress at the leading end of cracks is not released due to dislocations hardly moving, and a slight non-uniformity inside the material becomes the stress focal point during deformation, and can become the starting point for breakage of the fibrous crystals. For this reason, it is more preferable to reduce the maximum dimension in a direction perpendicular to the longitudinal direction of a specific void as the maximum dimension in a direction perpendicular to the longitudinal direction of fibrous crystal grains is smaller. From such a viewpoint, relative to the average value for the maximum dimension in a direction perpendicular to the longitudinal direction of a plurality of fibrous crystal grains, the average value of the maximum dimension in a direction perpendicular to the longitudinal direction of a plurality of specific voids is preferably 4 to 15, and more preferably 5 to 10. It should be noted that, it cannot be surmised from the non-fibrous microstructure, whether both optimizing of the functional effects thereof and strength characteristic will be achieved if decreasing which dimension of voids and by how much.

It should be noted that "average value for the maximum dimension in a direction perpendicular to the longitudinal direction of a plurality of specific voids" is calculated as follows. In the cross section shown in FIG. 1, in an area of 10000 µm$^2$ including the "central part" (observation field of view: longitudinal direction (98 to 148 µm)×thickness direction (73 to 110 µm)), the maximum dimension in a direction perpendicular to the longitudinal direction of all specific voids included in one field of view is measured. Similarly observation is carried out in a total of 5 randomly selected fields of view, and the average value for the maximum dimension in a direction perpendicular to the longitudinal direction of all specific voids observed in the 5 fields of view is obtained.

(1) Alloy Composition

The alloy composition of the aluminum alloy material of the present invention and the function thereof will be shown.

The aluminum alloy material of the present invention, as the basic composition, contains 0.20 to 1.80 mass % of Mg, 0.20 to 2.00 mass % of Si and 0.01 to 1.50 mass % of Fe, and further contains as appropriate no more than 2.00 mass % in total of at least one selected from the group consisting of RE, Ag, Zn, Ni, Co, Au, Mn, Cr, V, Zr, Sn, Ti and B, as optional added components.

<Mg: 0.20 to 1.80 Mass %>

Mg (magnesium) has a function of making a solid solution in the aluminum base material and strengthening, as well as a function of improving the tensile strength by the synergistic effect with Si. However, if the Mg content is less than 0.20 mass %, the above-mentioned functional effect will be insufficient, and if the Mg content exceeds 1.80 mass %, a crystallized product will be formed, and the workability (wire drawing workability, bending workability, etc.) will decline. Therefore, the Mg content is set as 0.20 to 1.80 mass %, and is preferably 0.40 to 1.40 mass %.

<Si: 0.20 to 2.00 Mass %>

Si (silicon) has a function of making a solid solution in the aluminum base material and strengthening, as well as a function of improving the tensile strength and bending fatigue resistance by the synergistic effect with Mg. However, if the Si content is less than 0.20 mass %, the above-mentioned functional effect will be insufficient, and if the Si content exceeds 2.00 mass %, a crystallized product will be formed, and the workability will decline. Therefore, the Mg content is set as 0.20 to 2.00 mass %, and is preferably 0.40 to 1.40 mass %.

<Fe: 0.01 to 1.50 Mass %>

Fe (iron) is an element which mainly contributes to fining of crystal grains by forming an Al—Fe-based intermetallic compound, and improves the tensile strength. Herein, intermetallic compound refers to a compound constituted by two or more types of metals. Fe can only form a solid solution in 0.05 mass % at 655° C. in Al, and since it is even fewer at room temperature, the remaining Fe which cannot form a solid solution in Al crystallizes or precipitates as an intermetallic compound of Al—Fe, Al—Fe—Si, Al—Fe—Si—Mg or the like. The intermetallic compound mainly constituted by Fe and Al in this way is called Fe-based compound in the present disclosure. This intermetallic compound contributes to fining of crystal grains, and improves the tensile strength. If the Fe content is less than 0.01 mass %, these functional effects will be insufficient, and if the Fe content exceeds 1.50 mass %, the crystallized product will become voluminous, and workability will decline. Herein, crystallized product refers to intermetallic compound produced during casting and solidification of the alloy. Therefore, the Fe content is set as 0.01 to 1.50 mass %, and preferably is 0.05 to 0.28 mass %, and more preferably is 0.05 to 0.23 mass %. It should be noted that, in the case of the cooling rate being slow during casting, the dispersion of Fe-based compound will be sparse, and the extent of adverse effect will rise.

<At Least One Selected from the Group of RE, Cu, Ag, Zn, Ni, Co, Au, Mn, Cr, V, Zr, Sn, Ti and B: No More than 2.00 Mass % in Total>

RE (rare earth element), Cu (copper), Ag (silver), Zn (zinc), Ni (nickel), Co (cobalt), Au (gold), Mn (manganese), Cr (chromium), Zr (zirconium), Sn (tin), Ti (titanium) and B (boron) are all elements which fine crystal grains upon casting, and decrease the number of specific voids and further improve strength and heat resistance, and can be appropriately added as necessary as optionally added elements. As the mechanism whereby these components improve heat resistance, for example, a mechanism which causes the energy of the crystal grain boundary to decline due to the difference between the atomic radius of the above-mentioned components and the atomic radius of aluminum being large, a mechanism which causes the mobility of the grain boundary to decline in the case of entering the grain boundaries due to the diffusion constant of the above-mentioned components being large, a mechanism which causes the diffusion phenomenon to be delayed due to the interaction with vacancies being large and trapping vacancies, etc. can be exemplified, and these mechanisms are considered to act synergistically. It should be noted that RE indicates a rare earth element and includes seventeen elements such as lanthanum, cerium and yttrium, these seventeen elements have similar effects, and since extraction of a single element chemically is difficult, the present invention stipulates as total amount.

If the total amount of the contents of these components exceeds 2.00 mass %, there is concern over the workability declining. Therefore, in the case of containing at least one selected from the group consisting of RE, Cu, Ag, Zn, Ni, Co, Au, Mn, Cr, V, Zr, Sn, Ti and B, the total amount of these contents is set as no more than 2.00 mass %, is preferably 0.06 to 2.00 mass %, and more preferably 0.30 to 1.20 mass %. These components may be contained independently as only one type, or may be contained in combination of two or more types. In particular, it is preferably to contain at least one selected from Zn, Ni, Co, Mn, Cr, V, Zr, Sn, Ti and B, when considering the corrosion resistance in the case of being used in an corrosive environment.

<RE: 0.00 to 2.00 Mass %>

RE is an element which fines crystal grains upon casting, decreases the number of specific voids, and further has an effect of improving the heat resistance. To sufficiently exhibit such functions, it is preferable to set the content of RE as at least 0.06 mass %, and more preferable to set as at least 0.30 mass %. On the other hand, when setting to exceed 2.00 mass % for the content of RE, the workability declines. Therefore, the content of RE is preferably set to no more than 2.00 mass %, more preferably no more than 1.50 mass %, and even more preferably no more than 1.20 mass %. It should be noted that, since RE is an optionally added elemental component, in the case of not adding RE, the lower limit amount for the RE content is set as 0.00 mass % considering also as the content of an impurity level.

<Cu: 0.00 to 2.00 Mass %>

Cu is an element which fines crystal grains upon casting, decreases the number of specific voids, and further has an effect of improving the heat resistance. To sufficiently exhibit such functions, it is preferable to set the content of Cu as at least 0.06 mass %, and more preferable to set as at least 0.30 mass %. On the other hand, when setting to exceed 2.00 mass % for the content of Cu, the workability declines. Therefore, the content of Cu is preferably set to no more than 2.00 mass %, more preferably no more than 1.50 mass %, and even more preferably no more than 1.20 mass %. It should be noted that, since Cu is an optionally added elemental component, in the case of not adding Cu, the lower limit amount for the Cu content is set as 0.00 mass % considering also as the content of an impurity level.

<Ag: 0.00 to 2.00 Mass %>

Ag is an element which fines crystal grains upon casting, decreases the number of specific voids, and further has an effect of improving the heat resistance. To sufficiently exhibit such functions, it is preferable to set the content of Ag as at least 0.06 mass %, and more preferable to set as at least 0.30 mass %. On the other hand, when setting to exceed 2.00 mass % for the content of Ag, the workability declines. Therefore, the content of Ag is preferably set to no more than 2.00 mass %, more preferably no more than 1.50 mass %, and even more preferably no more than 1.20 mass %. It should be noted that, since Ag is an optionally added elemental component, in the case of not adding Ag, the lower limit amount for the Ag content is set as 0.00 mass % considering also as the content of an impurity level.

<Zn: 0.00 to 2.00 Mass %>

Zn is an element which fines crystal grains upon casting, decreases the number of specific voids, and further has an effect of improving the heat resistance and corrosion resistance in the case of being used in a corrosive environment. To sufficiently exhibit such functions, it is preferable to set the content of Zn as at least 0.06 mass %, and more preferable to set as at least 0.30 mass %. On the other hand, when setting to exceed 2.00 mass % for the content of Zn, the workability declines. Therefore, the content of Zn is preferably set to no more than 2.00 mass %, more preferably no more than 1.50 mass %, and even more preferably no more than 1.20 mass %. It should be noted that, since Zn is an optionally added elemental component, in the case of not adding Zn, the lower limit amount for the Zn content is set as 0.00 mass % considering also as the content of an impurity level.

<Ni: 0.00 to 2.00 Mass %>

Ni is an element which fines crystal grains upon casting, decreases the number of specific voids, and further has an effect of improving the heat resistance and corrosion resistance in the case of being used in a corrosive environment. To sufficiently exhibit such functions, it is preferable to set the content of Ni as at least 0.06 mass %, and more preferable to set as at least 0.30 mass %. On the other hand, when setting to exceed 2.00 mass % for the content of Ni, the workability declines. Therefore, the content of Ni is preferably set to no more than 2.00 mass %, more preferably no more than 1.50 mass %, and even more preferably no more than 1.20 mass %. It should be noted that, since Ni is an optionally added elemental component, in the case of not adding Ni, the lower limit amount for the Ni content is set as 0.00 mass % considering also as the content of an impurity level.

<Co: 0.00 to 2.00 Mass %>

Co is an element which fines crystal grains upon casting, decreases the number of specific voids, and further has an effect of improving the heat resistance and corrosion resistance in the case of being used in a corrosive environment. To sufficiently exhibit such functions, it is preferable to set the content of Co as at least 0.06 mass %, and more preferable to set as at least 0.30 mass %. On the other hand, when setting to exceed 2.00 mass % for the content of Co, the workability declines. Therefore, the content of Co is preferably set to no more than 2.00 mass %, more preferably no more than 1.50 mass %, and even more preferably no more than 1.20 mass %. It should be noted that, since Co is an optionally added elemental component, in the case of not adding Co, the lower limit amount for the Co content is set as 0.00 mass % considering also as the content of an impurity level.

<Au: 0.00 to 2.00 Mass %>

Au is an element which fines crystal grains upon casting, decreases the number of specific voids, and further has an effect of improving the heat resistance. To sufficiently exhibit such functions, it is preferable to set the content of Au as at least 0.06 mass %, and more preferable to set as at least 0.30 mass %. On the other hand, when setting to exceed 2.00 mass % for the content of Au, the workability declines. Therefore, the content of Au is preferably set to no more than 2.00 mass %, more preferably no more than 1.50 mass %, and even more preferably no more than 1.20 mass %. It should be noted that, since Au is an optionally added elemental component, in the case of not adding Au, the lower limit amount for the Au content is set as 0.00 mass % considering also as the content of an impurity level.

<Mn: 0.00 to 2.00 Mass %>

Mn is an element which fines crystal grains upon casting, decreases the number of specific voids, and further has an effect of improving the heat resistance and corrosion resistance in the case of being used in a corrosive environment. To sufficiently exhibit such functions, it is preferable to set the content of Mn as at least 0.06 mass %, and more preferable to set as at least 0.30 mass %. On the other hand, when setting to exceed 2.00 mass % for the content of Mn, the workability declines. Therefore, the content of Mn is preferably set to no more than 2.00 mass %, more preferably no more than 1.50 mass %, and even more preferably no more than 1.20 mass %. It should be noted that, since Mn is an optionally added elemental component, in the case of not adding Mn, the lower limit amount for the Mn content is set as 0.00 mass % considering also as the content of an impurity level.

<Cr: 0.00 to 2.00 Mass %>

Cr is an element which fines crystal grains upon casting, decreases the number of specific voids, and further has an effect of improving the heat resistance and corrosion resistance in the case of being used in a corrosive environment. To sufficiently exhibit such functions, it is preferable to set the content of Cr as at least 0.06 mass %, and more preferable to set as at least 0.30 mass %. On the other hand, when setting to exceed 2.00 mass % for the content of Cr, the workability declines. Therefore, the content of Cr is preferably set to no more than 2.00 mass %, more preferably no more than 1.50 mass %, and even more preferably no more than 1.20 mass %. It should be noted that, since Cr is an optionally added elemental component, in the case of not adding Cr, the lower limit amount for the Cr content is set as 0.00 mass % considering also as the content of an impurity level.

<V: 0.00 to 2.00 Mass %>

V is an element which fines crystal grains upon casting, decreases the number of specific voids, and further has an effect of improving the heat resistance and corrosion resistance in the case of being used in a corrosive environment. To sufficiently exhibit such functions, it is preferable to set the content of V as at least 0.06 mass %, and more preferable to set as at least 0.30 mass %. On the other hand, when setting to exceed 2.00 mass % for the content of V, the workability declines. Therefore, the content of V is preferably set to no more than 2.00 mass %, more preferably no more than 1.50 mass %, and even more preferably no more than 1.20 mass %. It should be noted that, since V is an optionally added elemental component, in the case of not adding V, the lower limit amount for the V content is set as 0.00 mass % considering also as the content of an impurity level.

<Zr: 0.00 to 2.00 Mass %>

Zr is an element which fines crystal grains upon casting, decreases the number of specific voids, and further has an effect of improving the heat resistance and corrosion resistance in the case of being used in a corrosive environment. To sufficiently exhibit such functions, it is preferable to set the content of Zr as at least 0.06 mass %, and more preferable to set as at least 0.30 mass %. On the other hand, when setting to exceed 2.00 mass % for the content of Zr, the workability declines. Therefore, the content of Zr is preferably set to no more than 2.00 mass %, more preferably no more than 1.50 mass %, and even more preferably no more than 1.20 mass %. It should be noted that, since Zr is an optionally added elemental component, in the case of not adding Zr, the lower limit amount for the Zr content is set as 0.00 mass % considering also as the content of an impurity level.

<Sn: 0.00 to 2.00 Mass %>

Sn is an element which fines crystal grains upon casting, decreases the number of specific voids, and further has an effect of improving the heat resistance and corrosion resistance in the case of being used in a corrosive environment. To sufficiently exhibit such functions, it is preferable to set the content of Sn as at least 0.06 mass %, and more preferable to set as at least 0.30 mass %. On the other hand, when setting to exceed 2.00 mass % for the content of Sn, the workability declines. Therefore, the content of Sn is preferably set to no more than 2.00 mass %, more preferably no more than 1.50 mass %, and even more preferably no more than 1.20 mass %. It should be noted that, since Sn is an optionally added elemental component, in the case of not adding Sn, the lower limit amount for the Sn content is set as 0.00 mass % considering also as the content of an impurity level.

<Ti: 0.00 to 2.00 Mass %>

Ti is an element which fines crystal grains upon casting, decreases the number of specific voids, and further has an effect of improving the heat resistance and corrosion resistance in the case of being used in a corrosive environment. To sufficiently exhibit the functions of fining the crystal grains upon casting, and improving heat resistance, it is preferable to set the content of Ti as at least 0.005 mass %. In addition to this, to sufficiently exhibit the effect of improving corrosion resistance in the case of being used in a corrosive environment, it is more preferable to set the content of Ti as at least 0.06 mass %, and even more preferable to set as at least 0.30 mass %. On the other hand, when setting to exceed 2.000 mass % for the content of Ti, the workability declines. Therefore, the content of Ti is preferably set to no more than 2.000 mass %, more preferably no more than 1.500 mass %, and even more preferably no more than 1.200 mass %. It should be noted that, since Ti is an optionally added elemental component, in the case of not adding Ti, the lower limit amount for the Ti content is set as 0.00 mass % considering also as the content of an impurity level.

<B: 0.00 to 2.00 Mass %>

B is an element which fines crystal grains upon casting, decreases the number of specific voids, and further has an effect of improving the heat resistance and corrosion resistance in the case of being used in a corrosive environment. To sufficiently exhibit the functions of fining the crystal grains upon casting, and improving heat resistance, it is preferable to set the content of B as at least 0.005 mass %. In addition to this, to sufficiently exhibit the effect of improving corrosion resistance in the case of being used in a corrosive environment, it is more preferable to set the content of B as at least 0.06 mass %, and even more preferable to set as at least 0.30 mass %. On the other hand, when setting to exceed 2.000 mass % for the content of B, the workability declines. Therefore, the content of B is preferably set to no more than 2.000 mass %, more preferably no more than 1.500 mass %, and even more preferably no more than 1.200 mass %. It should be noted that, since B is an optionally added elemental component, in the case of not adding B, the lower limit amount for the B content is set as 0.00 mass % considering also as the content of an impurity level.

<Balance: Al and Inevitable Impurities>

The balance other than the aforementioned components is Al (aluminum) and inevitable impurities. The inevitable impurities referred to herein indicate impurities of a content level which can be included inevitably in a manufacturing process. The inevitable impurities, due to possibly becoming a cause for a decline in conductivity depending on the content, are preferably suppressed to an extent of content of inevitable impurities considering the decline in conductivity. As components which can be exemplified as inevitable impurities, for example, Bi (bismuth), Pb (lead), Ga (gallium), Sr (strontium), etc. can be exemplified. It should be noted that the upper limit for the component contents of these inevitable impurities is acceptable if set to 0.05 mass % for each component, and 0.15 mass % in total amount of the components of inevitable impurities.

Such an aluminum alloy material can be realized by controlling a combination of the alloy composition and manufacturing process. Hereinafter, a suitable manufacturing method of the aluminum alloy material of the present invention will be explained.

(2) Manufacturing Method of Aluminum Alloy Material According to Example of Present Invention Such an aluminum alloy material according to the Example of the present invention is characterized by achieving higher strength, by introducing crystal grain boundaries inside of an Al—Mg—Si—Fe-based alloy in particular. Therefore, with a conventional aluminum alloy material, the approach to enhancing strength greatly differs from a method of precipitation hardening a Mg—Si compound which is generally carried out. Furthermore, with the aluminum alloy material according to the Examples of the present invention, it does not simply achieve enhanced strength, but changes the metallic microstructure formed by deformation, by way of changing the frictional state between the material and tool. As a result thereof, it is characterized by enhanced strength and workability both being achievable.

Hereinafter, a preferred manufacturing method of the aluminum alloy material of the present invention will be explained in detail. This manufacturing method includes at least an interfacial strength enhancing heat treatment (1), and cold working (2).

<Interfacial Strength Enhancing Heat Treatment (1)>

As a method for decreasing voids in the aluminum alloy material, before the cold working (2) described later, or before at least a final cold working in the case of performing the cold working a plurality of times, the interfacial strength enhancing heat treatment (1) is performed.

Figure 4:
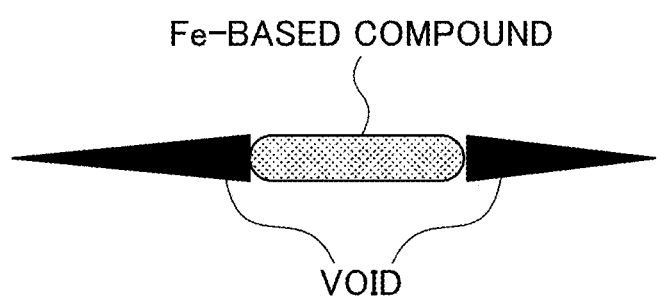
FIG. 4 is a schematic diagram of a void in the aluminum alloy material.

The voids often generate in the cold working, by the interface between the aluminum alloy which is the parent phase and the Fe-based compound which is the second phase peeling, and the peeled part expanding. Therefore, the Fe-based compound exists at the circumference of the void formed in this way. FIG. 4 is a schematic diagram of a void in the aluminum alloy material.

In order to prevent the formation of such voids, the heat treatment is conducted on the aluminum alloy prior to the cold working [2], or in the case of performing the cooling process a plurality of times, prior to at least the final cold working. By such a heat treatment, it is possible to promote atomic diffusion of the interface and vicinity thereof to raise the interfacial strength, and establish a state hardly peeling the interface between the aluminum alloy and Fe-based compound. Heat treatment preferably maintains 320° C. to 380° C. for 10 minutes to 24 hours. If the temperature is lower, or shorter time than this, the atomic diffusion will be insufficient, and thus the effect becomes insufficient. In addition, if the temperature is higher or longer time than this, a brittle intermetallic compound forms, and defects in the interface form from the difference in coefficient of linear expansion of the parent phase and intermetallic compound containing Fe during heat treatment.

The aluminum alloy raw material is not particularly limited so long as having the above-mentioned alloy composition, for example, and can use an extruded material, ingot material, hot processed material (for example, hot rolled material), cold processed material (for example, cold rolled material, etc.), etc. by appropriately selecting according to the use purpose.

<Cold Working (2)>

Usually, when the stress of deformation applies to a metal material, crystal slip occurs as an elementary process of deformation of the metal crystal. The stress necessary in deformation is smaller with a metal material for which such crystal slip tends to occur, and is considered low strength. For this reason, upon raising the strength of the metal material, it is important to suppress crystal slip occurring in the metallic microstructure. As a inhibiting factor of such crystal slip, the existence of crystal grain boundaries in the metallic microstructure can be exemplified. Such crystal grain boundaries can prevent crystal slip from propagating within the metallic microstructure, upon the stress of deformation applying to the metal material, a result of which the strength of the metal material is raised.

For this reason, upon raising the strength of the metal material, it is considered desirable to introduce crystal grain boundaries into the metallic microstructure in high density. Herein, as the formation mechanism of the crystal grain boundary, for example, splitting of metal crystals has been considered, accompanying formation of the next such metallic microstructure.

Usually, inside of a polycrystalline material, the stress state becomes a complicated multi-axis state, due to the difference in orientation of adjacent crystal grains, and the spatial distribution of distortion between the vicinity of the surface contacting the machine tool and a bulk interior. From these influences, the crystal grains which were unidirectional prior to deformation may split into a plurality of directions accompanying deformation, and the crystal grain boundary is formed between the split crystals. The added Mg and Si have a function of stabilizing the crystal grain boundary formed during processing.

The cold working (2) may be performed only once, or may be performed a plurality of times. In the present invention, the total degree of processing of the cold working (2) (total processing degree) is defined as 3.8 or more. In particular, by increasing the total processing degree, it is possible to promote splitting of metal crystals accompanying deformation of the metallic microstructure, and it is possible to introduce crystal grain boundaries inside of the aluminum alloy material in high density. As a result thereof, the strength of the aluminum alloy material improves drastically. Such a total processing degree is preferably defined as at least 6.5, more preferably at least 8.5, and even more preferably at least 5. In addition, although the upper limit for the total processing degree is not particularly defined, it is normally 15.

It should be noted that the processing degree η is expressed by Formula (1) below, when defining the cross-sectional area before processing as s1, and the cross-sectional area after processing as s2 (s1>s2). Processing degree (non-dimensional): $\eta = \ln(s1/s2)$ . . . (1)

It should be noted that, upon calculation of this processing degree, in the case of performing the cold working (2) a plurality of times, s1 defines the cross-sectional area of the aluminum alloy on which cold working (2) was not conducted after the interfacial strength enhancing heat treatment (1), and s2 defines the cross-sectional area of the aluminum alloy on which all cold working (2) was conducted after the interfacial strength enhancing heat treatment (1). In addition, without considering the cold working performed earlier than the interfacial strength enhancing heat treatment (1), the cold working (2) after the interfacial strength enhancing heat treatment (1) is considered.

In addition, the processing method may be appropriately selected according to the objective shape of the aluminum alloy material (wire rod, plate, strip, foil, etc.), and for example, cassette roller dies, groove roll rolling, round wire rolling, drawing by dies or the like, swaging, etc. can be exemplified. In any processing method, the metallic microstructure of the present invention is obtained by increasing the friction between the tool and material, and actively introducing additional shearing strain.

In addition, with the present invention, as mentioned above, processing of high processing degree is performed by methods such as drawing by die and rolling, on the aluminum alloy material. For this reason, a long aluminum alloy material is obtained as a result. On the other hand, conventional manufacturing methods of aluminum alloy material such as powder sintering, compression torsion processing, high pressure torsion (HPT), forging, and equal channel angular pressing (ECAP), it is difficult to obtain such a long aluminum alloy material. Such an aluminum alloy material of the present invention is preferably manufactured in a length of at least 10 m. It should be noted that, although an upper limit for the length of the aluminum alloy material during manufacturing is not particularly provided, considering the workability, etc., it is preferably set as 6000 m.

In addition, with the aluminum alloy material of the present invention, since increasing the processing degree for fining of crystal grains in the way mentioned above is effective, the configuration of the present invention tends to be realized as reducing diameter in the case of producing as a wire rod in particular, and as thinning in the case of producing as a plate or foil.

In particular, in the case of the aluminum alloy material of the present invention being a wire rod, the wire diameter thereof is preferably no more than 1 mm, more preferably no more than 0.5 mm, even more preferably 0.35 mm, particularly preferably no more than 0.22 mm, and most preferably no more than 0.12 mm. It should be noted that, although a lower limit is not particularly provided, it is preferably set as 0.01 mm considering the workability, etc. The aluminum alloy wire rod of the present invention has high strength even if being a fine wire; therefore, being able to use thin in a single wire is one advantage.

In addition, in the case of the aluminum alloy material of the present invention being a plate, the plate thickness thereof is preferably no more than 2 mm, more preferably no more than 1 mm, even more preferably no more than 0.4 mm, and particularly preferably no more than 0.2 mm. It should be noted that, although a lower limit is not particularly provided, it is preferably set as 0.01 mm. The aluminum alloy plate of the present invention has high strength even in the form of a thin plate or foil; therefore, being able to use as a single layer of thin thickness is one advantage.

In addition, the aluminum alloy material of the present invention as mentioned above is processed to be fine or thin; however, it is possible to prepare and join a plurality of such aluminum alloy materials to make thicker or thinner, and use in the objective application. It should be noted that the method of joining can employ a well-known method and, for example, pressure welding, welding, joining by adhesive, friction agitation welding, etc. can be exemplified. In addition, in the case of the aluminum alloy material being a wire rod, a plurality of bundles are bundled and twisted together to make an aluminum alloy stranded wire which can be used in the objective application. It should be noted that a step of temper annealing (3) described later may be performed after performing processing by joining or stranding up the aluminum alloy material subjected to the above-mentioned cold working (2).

<Temper Annealing (3)>

Although not an essential aspect, temper annealing (3) may be performed as a final process on the aluminum alloy with the purpose of the release of residual stress and improving elongation. In the case of performing temper annealing (3), the processing temperature is set as 50 to 130° C. In the case of the processing temperature of the temper annealing (3) being less than 50° C., the above such effects are hardly obtained, growth of crystal grains occurs by recovery and recrystallization when exceeding 130° C., and the strength declines. In addition, the holding time of the temper annealing (3) is preferably 24 to 48 hours. It should be noted that all conditions of such thermal treatment can be appropriately adjusted according to the type and amount of unavoidable impurities, and solid solution/precipitation state of aluminum alloy material.

(3) Structural Characteristics of Aluminum Alloy Material of Present Invention

<Metallic Microstructure>

In the aluminum alloy material of the present invention manufactured by the aforementioned such manufacturing method, the crystal grain boundary is introduced within the metallic microstructure in high density. Such an aluminum alloy material of the present invention has a fibrous metallic microstructure in which a plurality of crystal grains extend so as to be aligned in one direction, and the average value for the maximum dimension in a direction perpendicular to the longitudinal direction of the above plurality of crystal grains is no more than 400 nm. Such aluminum alloy material, by having a unique metallic microstructure not existing in a conventional aluminum alloy material, has remarkably high strength, compared to a conventional aluminum alloy material (provided that high strength aluminum alloy material of 2000 series or 7000 series with poor corrosion resistance, workability, etc. are excluded).

The metallic microstructure of the aluminum alloy material of the present invention has a fibrous microstructure, and becomes a state in which fibrous crystal grains of elongated shape extend so as to be aligned in one direction. Herein, "one direction" corresponds to the processing direction (drawing direction) of the aluminum alloy material, and in the case of the aluminum alloy material being a wire rod, for example, corresponds to the wire drawing direction, and in the case of a plate or foil, for example, corresponds to the rolling direction. In addition, the aluminum alloy material of the present invention exhibits particularly excellent strength characteristics on the tensile stress parallel to such a processing direction in particular.

In addition, the above-mentioned one direction preferably corresponds to the longitudinal direction of the aluminum alloy material. In other words, usually, the aluminum alloy material, unless being fragmented in a dimension shorter than the dimension in a direction perpendicular to the processing direction thereof, the drawing direction thereof corresponds to the longitudinal direction thereof.

In addition, in a cross section parallel to the above-mentioned one direction, the average value of the maximum dimension in a direction perpendicular to the longitudinal direction of a plurality of crystal grains is no more than 400 nm, more preferably no more than 340 nm, even more preferably no more than 240 nm, particularly preferably no more than 200 nm, even more preferably no more than 160 nm, and most preferably no more than 120 nm. With the fibrous metallic microstructure in which fine crystal grains of such a diameter (maximum dimension in direction perpendicular to longitudinal direction of crystal grains) extend in one direction, the crystal grain boundaries are formed in high density, and according to such a metallic microstructure, it is possible to effectively suppress so that crystal slip does not occur accompanying deformation, a result of which succeeding in development of an aluminum alloy material that can realize high strength which could not be achieved with a conventional aluminum-based material. In addition, by the crystal grains being fine, there is a function of suppressing non-uniform deformation in bending deformation. It should be noted that the average value of the maximum dimension in a direction perpendicular to the longitudinal direction of the plurality of crystal grains is preferably smaller for realizing high strength; however, the lower limit in manufacturing or as a physical limitation is 20 nm, for example.

In addition, the average value of the maximum dimension in the longitudinal direction of the crystal grains is not necessarily specified; however, it is preferably at least 1200 nm, more preferably at least 1700 nm, and even more preferably at least 2200 nm. In addition, the aspect ratio of the above-mentioned crystal grains is preferably at least 10, and more preferably at least 20.

In addition, in the central part of the aluminum alloy material, in the case of observing a cross section of an area of 10000 μm², the number of specific voids n having a maximum dimension in a direction perpendicular to the longitudinal direction of at least 1.0 μm is no more than 15, more preferably no more than 13, and even more preferably no more than 10. As mentioned above, by the number of the above-mentioned predetermined specific voids being no more than 15, it is possible to suppress destruction in the case of stress being applied to this aluminum alloy material. In addition, such specific voids preferably do not ideally exist from the viewpoint of suppressing destruction of the aluminum alloy material. However, when manufacturing so that specific voids do not exist in the aluminum alloy material, since the mass production cost rises dramatically, the number of specific voids is acceptable if the range of 1 to 15.

(4) Characteristics of Aluminum Alloy Material of Present Invention (0.2% Yield Strength)

The tensile strength is defined as a value measured in accordance with JIS Z2241:2011. The detailed measurement conditions are explained in the section of Examples described later.

The aluminum alloy material of the present invention, particularly in the case of being a wire rod, preferably has a 0.2% yield strength of at least 360 MPa. Such 0.2% yield strength surpasses, by more than 10%, the 0.2% yield strength of A6201 which is the highest strength among aluminum alloys for electrical conduction shown in ASTM INTERNATIONAL (Standard name: B398/B398M-14). Therefore, for example, in the case of applying the aluminum alloy wire rod of the present application to a cable, there is an effect of reducing by 10% the cross-sectional area and weight of the conductor of a cable, while maintaining the high tension of the cable. In addition, a preferred 0.2% yield strength of the present invention is 400 MPa or more. Such a tensile strength corresponds to the average value for the range of tensile strengths of hard-drawn copper wire shown in ASTM INTERNATIONAL (Standard name: B1-13). Therefore, such an aluminum alloy wire rod of the present invention, for example, can be ideally used in applications in which hard-drawn copper wire is being used, and has an effect of being able to substitute hard-drawn copper wire. Furthermore, a more preferable 0.2% yield strength of the present invention is at least 440 MPa, an even more preferable 0.2% yield strength is at least 480 MPa, and such a tensile strength is comparable with the highest value for the above-mentioned hard-drawn copper wire. In addition, a particularly preferable 0.2% yield strength of the present invention is at least 520 MPa, and a more preferable 0.2% yield strength is at least 600 MPa. Such an aluminum alloy material of the present invention can be used even as a substitute for various copper-based and stainless steel-based materials. In addition, the aluminum alloy material of the present invention having such high strength can be used as a substitute of strong wire drawn material of dilute copper alloy such as of a Cu—Sn system or Cu—Cr system. It should be noted that, although the upper limit for the tensile strength of the aluminum alloy material of the present invention is not particularly limited, it is 1,000 MPa, for example. In addition, since the aluminum alloy material of the present invention is superior in heat resistance, it can maintain the above such high tensile strength even after heating.

(Break Elongation)

Break elongation is defined as a value measured by carrying out tensile testing using a precision universal testing machine (manufactured by Shimadzu Corporation), in accordance with JIS Z2241:2001. The detailed measurement conditions are explained in the section of Examples described later. The aluminum alloy material of the present invention, particularly in the case of being a wire rod, preferably has a break elongation of at least 2.0, more preferably at least 3.0, even more preferably at least 3.5, and particularly preferably at least 4.0. In addition, the break elongation is preferably no more than 12.0, more preferably no more than 10.0, and even more preferably no more than 8.0.

In addition, the aluminum alloy material of the present invention is not only used as a bare material, and the surface of the aluminum alloy material may be covered with another metal, by a method such as plating or cladding. Also in this case, it is possible to exhibit the above-mentioned effects. As the type of covering metal, for example, one or more types of metals selected from the group consisting of Cu, Ni, Ag, Sn, Au, Pd and Pt, alloys thereof, etc. can be exemplified. There are effects such as a reduction in contact resistance and improvement in corrosion resistance. The coverage rate, in a cross section perpendicular to the longitudinal direction, is preferably set up to on the order of 25% of the total surface area. This is because, if the coverage rate is too much, the weight reduction effect decreases. It is preferably no more than 156, and more preferably no more than 10%.

(5) Application of Aluminum Alloy Material of Present Invention

Every application in which an iron-based material, copper-based material and aluminum-based material is being used can be the target of the aluminum alloy material of the present invention. More specifically, it is possible to suitably use as a conductive member such as a wire or cable, a battery member such as a mesh or net for a current collector, a fastening component such as a screw, bolt or rivet, a spring component such as a coil spring, a spring member for electrical contact such as a connector or terminal, a structural component such as a shaft or frame, a guide wire, bonding wire for semiconductors, a winding used in a dynamo or motor, etc. In addition, the aluminum alloy material of the present invention, due to being superior in heat resistance, is more suitable to applications in which heat resistance is particularly demanded.

As a more specific application example of a conductive member, it is possible to exemplify power lines such as overhead power lines, OPGW, underground power lines, and undersea cables; communication lines such as telephone cables and coaxial cables, equipment wires such as wired drone cables, cabtire cables, EV/HEW charge cables, offshore wind power generator twisted cables, elevator cables, umbilical cables, robot cables, overhead train wire or trolley wire; transportation electrical wires such as an automotive wiring harness, ship electrical wires or aircraft electrical wires; bus bar, lead frame, flexible flat cable, lightning rod, antenna, connector, terminal or braid of cable; etc.

As the battery member, electrodes for a solar cell, etc. can be exemplified.

As a more specific application example of a fastening component (member), a potato screw, staple, thumb tack and the like can be exemplified.

As a more specific application example of a fastening component (member), a potato screw, staple, thumb tack and the like can be exemplified.

As more specific application examples of a structural component (member), scaffold for building site, conveyor mesh belt, metal fibers for clothing, chain mail, fence, insect net, zipper, fastener, clip, aluminum wool, bicycle components such as brake wire and spokes, reinforcing wire of tempered glass, pipe seal, metal packing, protective/reinforcing material of cables, core of fanbelt, wire for actuator drive, chain, hanger, soundproofing mesh, tray and the like can be exemplified.

In addition, it is also suitable as a metal fiber added in order to impart electrical conductivity to a resin-based material, plastic material, cloth, etc., and controlling the strength or elasticity.

In addition, it is also suitable in consumer parts and medical parts such as eyeglass frames, watch belts, fountain pen nibs, forks, helmets, injection needles.

Although an embodiment of the present invention has been explained above, the present invention is not to be limited to the above embodiment, and encompasses every mode included in the gist and scope of claims of the present invention, and can be modified in a variety of ways within the scope of the present invention.

EXAMPLES

Next, in order to further clarify the effects of the present invention, Examples of the present invention and Comparative Examples will be explained; however, the present invention is not to be limited to these Examples.

Examples 1 to 36

First, each rod member of 10 mm diameter having the alloy composition shown in Table 2-1 was prepared. Next, using each rod member, the respective aluminum alloy wire members (0.11 to 0.181 mm diameter) were produced with the manufacturing conditions shown in Table 2-1.

It should be noted that manufacturing conditions A to H shown in Table 2-1 are specifically as follows.

<Manufacturing Condition A>

Cold drawing was performed to establish a wire diameter of 1.32 mm, then interfacial strength enhancing heat treatment (1) holding at 360° C. for 1 hour was performed, after which cold drawing (2) with a processing degree of 4.0 was performed to establish a wire diameter of 0.18 mm.

<Manufacturing Condition B>

Cold drawing was performed to establish a wire diameter of 2.80 mm, then interfacial strength enhancing heat treatment (1) holding at 360° C. for 1 hour was performed, after which cold drawing (2) with a processing degree of 5.5 was performed to establish a wire diameter of 0.18 mm.

<Manufacturing Condition C>

Cold drawing was performed to establish a wire diameter of 6.00 mm, then interfacial strength enhancing heat treatment (1) holding at 360° C. for 1 hour was performed, after which cold drawing (2) with a processing degree of 7.0 was performed to establish a wire diameter of 0.18 mm.

<Manufacturing Condition D>

After performing interfacial strength enhancing heat treatment (1) holding at 360° C. for 1 hour, cold drawing (2) with a processing degree of 9.0 was performed to establish a wire diameter of 0.18 mm.

<Manufacturing Condition E>

After the manufacturing condition A, temper annealing (3) holding at 100° C. for 36 hours was performed.

<Manufacturing Condition F>

After the manufacturing condition V, temper annealing (3) holding at 100° C. for 36 hours was performed.

<Manufacturing Condition G>

After the manufacturing condition C, temper annealing (3) holding at 100° C. for 36 hours was performed.

<Manufacturing Condition H>

After the manufacturing condition D, temper annealing (3) holding at 100° C. for 36 hours was performed.

Comparative Example 1

In Comparative Example 1, an aluminum wire material (0.18 mm diameter) was produced at the manufacturing conditions shown in Table 2-3 using a rod material of 10 mm diameter consisting of 99.99 mass % Al.

Comparative Example 2

In Comparative Example 2, an aluminum alloy wire material (0.18 mm diameter) was produced at the manufacturing conditions shown in Table 2-3, using a rod material of 10 mm diameter having the alloy composition shown in Table 2-3.

Comparative Examples 3 to 5

The following manufacturing condition J was conducted on each rod material of 10 mm diameter having the alloy composition shown in Table 2-3.
<Manufacturing Condition J>
Although cold drawing (2) was performed after performing interfacial strength enhancing heat treatment (1) holding at 460° C. for 1 hour, wire breakage often occurred midway, and interrupted trial production.

Comparative Examples 6 to 7

The following manufacturing condition K was conducted on each rod material of 10 mm diameter having the alloy composition shown in Table 2-3.
<Manufacturing Condition C>
Cold drawing was performed to establish a wire diameter of 1.03 mm, then interfacial strength enhancing heat treatment (1) holding at 360° C. for 1 hour was performed, after which cold drawing (2) with a processing degree of 3.5 was performed to establish a wire diameter of 0.18 mm.

Comparative Examples 8 to 9

The following manufacturing condition L was conducted on each rod material of 10 mm diameter having the alloy composition shown in Table 2-3.
<Manufacturing Condition L>
Only cold drawing (2) was performed without performing the interfacial strength enhancing heat treatment (1); however, wire breakage often occurred midway, and interrupted trial production.

Comparative Examples 10 to 11

The following manufacturing condition M was conducted on each rod material of 10 mm diameter having the alloy composition shown in Table 2-3.
<Manufacturing Condition M>
After performing heat treatment holding at 540° C. for 1 hour, the cold drawing (2) with a processing degree of 9.0 was performed to produce an aluminum alloy wire material (0.11 mm diameter).

Comparative Examples 12 to 13

The following manufacturing condition N was conducted on each rod material of 10 mm diameter having the alloy composition shown in Table 2-3.
<Manufacturing Condition N>
After performing heat treatment holding at 390° C. for 1 hour, the cold drawing (2) was performed; however, wire breakage often occurred midway, and interrupted trial production.

(Comparative Example 14): Manufacturing Condition O of Table 2-3

Al base metal for electric use was dissolved, simple substance Mg, Al-25 mass % Si mother alloy, Al-6 mass % Fe mother alloy, Al-50 mass % Cu mother alloy, Al-10 mass % Cr mother alloy were added thereto and dissolved, to produce molten metal having an alloy composition of Al-1.03 Mg-0.90 Si-0.20 Fe-0.16 Cu-0.15 Cr, then continuously cast rolled by a belt-and-wheel-type continuous cast-rolling machine to obtain rough drawing wire of 9.5 mm diameter. The obtained rough drawing wire was solution heat treated at 520° C. and water quenched, then accelerated aging with holding at 200° C. for 4 hours and wire drawing were performed; however, wire breakage often occurred due to voids often occurring within the wire midway, and interrupted trial production.

(Comparative Example 15): Manufacturing Condition P of Table 2-3

Using 99.8% purity aluminum for electric use, thereto was added each material of Al-6 mass % Fe mother alloy, Al-50 mass % Cu mother alloy, Al-20 mass % Si mother alloy and simple substance Mg to produce molten metal having an alloy composition of Al-0.90 mass % Mg-0.80 mass % Si-0.20 mass % Fe-1.30 mass % Cu, and a rough drawing wire (18 mm diameter was obtained by a belt-and-wheel-type continuous casting-directed rolling. First wire drawing of 47% processing rate (processing degree 0.63) was conducted on the obtained rough drawing wire to make 9.5 mm diameter, and after performing solution heat treatment at 520° C. for 2 hours, was water quenched. This wire was aged at 200° C. for 4 hours, and second wire drawing was performed; however, wire breakage often occurred due to voids often occurring within the wire midway, and interrupted trial production.

(Comparative Example 16): Manufacturing Condition Q of Table 2-3

An alloy material of the chemical composition shown in Table 2-3 was prepared, and using a Properzi-type continuous cast-rolling machine, was continuously cast in a mold cooling the molten metal with water so that the average cooling rate from the molten metal temperature to 400° C. became 25° C./second, and after performing heat treatment holding at 550° C. for 10 seconds, hot rolling was performed to make a rod material of 9 mm diameter. Next, wire drawing to a diameter of 1.84 and intermediate heat treatment holding at 320° C. for 5 hours were conducted, and was then further wire drawn to a diameter of 0.3 mm. Then, after holding at 500° C. for 30 seconds, and solution heat treatment setting an average cooling rate to 150° C. of 19° C./second, aging heat treatment holding at 150° C. for 5 hours was performed. The maximum line tension from twice the final wire diameter until becoming the final wire diameter was established as 40 N.

(Comparative Example 17): Manufacturing Condition R of Table 2-3

In a graphite crucible, 99.95 mass % purity aluminum, 99.95 mass % purity magnesium, 99.99 mass % purity silicon and 99.95 mass % purity iron were respective charged in predetermined amounts, then agitated and melted at 720° C. by high frequency induction heating to produce molten metal having an alloy composition of Al, 0.60 mass % Mg, 0.30 mass % Si, 0.05 mass % Fe, this was moved to a container to which graphite dies were provided, whereby wire of 10 mm diameter and 100 mm length were continuously cast at a casting rate of about 300 ram/min via the water cooled graphite dies. Then, accumulated equivalent strain of 4.0 was introduced by the ECAP method. The recrystallization temperature at this stage was determined as 300° C. Then, in an inert gas atmosphere, preheating was performed for 2 hours at 250° C. Next, a first wire drawing process of 29% processing rate (processing degree 0.34) was conducted. The recrystallization temperature at this stage was determined as 300° C. Then, in an inert gas atmosphere, a first heat treatment was performed for 2 hours at 260° C. Subsequently, a second wire drawing process with a processing degree of 9.3 was performed by passing within water cooled wire drawing dies at a drawing rate of 500 mm/min. The recrystallization temperature at this stage was determined as 280° C. Then, in an inert gas atmosphere, a second heat treatment was performed for 1 hour at 220° C., and an aluminum alloy wire material (0.08 mm diameter) was obtained.

(Comparative Example 18): Manufacturing Condition S of Table 2-3

Si, Fe, Cu, Mg, Ti and Al were dissolved in the composition of Table 2-3, casted with a continuous casting machine to prepare a cast bar of 25 mm wire diameter, the cast bar was hot rolled to prepare an aluminum alloy wire of 9.5 mm wire diameter, and solution heat treatment was performed at 550° C. for 3 hours, then cooled. This aluminum alloy wire was straightened, washed and electrolytically degreased, then polished with a stainless steel brush. Oxygen-free copper tape of 10 ppm oxygen amount and 0.4 mm thickness was vertically attached, and the copper tape was molded into tubular form on the aluminum alloy wire so as to cover the aluminum alloy wire, and butting parts of copper tape were continuously welded by the TIG method. Then, cold wire drawing was performed by a wiredrawing machine using dies of 15 to 30% reduction of area to form a copper-clad aluminum alloy wire of 0.2 mm wire diameter.

(Comparative Example 19): Manufacturing Condition T of Table 2-3

An aluminum alloy containing 0.50 mass % of Mg, 0.60 mass % of Si and 0.30 mass % of Fe, and consisting of a balance of Al and inevitable impurities was dissolved. A rough drawing wire material having a wire diameter of 9.5 mm was formed by the Properzi method, and after holding at 550° C. for 5.5 hours, solution heat treatment quenching to room temperature was conducted. A wire drawn material of 0.32 mm wire diameter was formed by a drawing process using dies. While wire drawing to a wire diameter of 0.32 mm, intermediate heat treatment holding at 140° C. for 10 hours was conducted on an intermediate wire drawn material of 1.84 mm diameter. Finally, the final heat treatment holding at 140° C. for 5 hours was conducted.

[Evaluation]

Using the aluminum-based wire materials according to the above Examples of the present invention and Comparative Examples, the characteristic evaluations shown below were performed. The evaluation criteria of each property are as follows. The results are shown in Tables 2-2 and 2-4.

(1) Alloy Composition

Emission spectral analysis was performed in accordance with JIS H1305:2005. It should be noted that measurement was performed using an emission spectrophotometer (manufactured by Hitachi High-Tech Science).

(2) Observation of Crystal Size

Observation of the metallic microstructure was performed by TEM (Transmission Electron Microscopy) observation, using a transmission electron microscope (JEM-2100PLUS manufactured by JEOL Ltd). The acceleration voltage was observed at 200 kV.

As the observation sample, a cross section parallel to the longitudinal direction (drawing direction X) of the above-mentioned wire material was cut to 100 nm±20 nm by FIB (Focused Ion Beam), and the sample finished by ion milling was used.

In TEM observation, using grey contrast, the difference in contrast established was recognized as the orientation of crystals, and the boundary at which the contrast discontinuously differs as the crystal grain boundary. It should be noted that, according to the analysis conditions of the electron beam, since there are cases where there is no difference in grey contrast even though the metallic microstructure differs, in this case, to the grain boundary was recognized by changing the angle between the electron beam and sample by tilting in ±3% increments by a two sample rotation axes perpendicular within a sample stage of the electron microscope, and photographing the observation plane at a plurality of diffraction conditions. It should be noted that the observation field of view was defined as longitudinal direction (15 to 40) μm×thickness direction (15 to 40) μm, and observation was performed at a central part in the thickness direction on a line corresponding to the wire diameter direction (direction perpendicular to longitudinal direction) in the above-mentioned cross section, i.e. position in the vicinity of the middle of the center and the surface (position on about ¼ of the wire diameter to the center side from the surface side). The observation field of view was appropriately adjusted according to the size of the crystal grains. In addition, the observation magnification was set to 1000 times.

Figure 5:
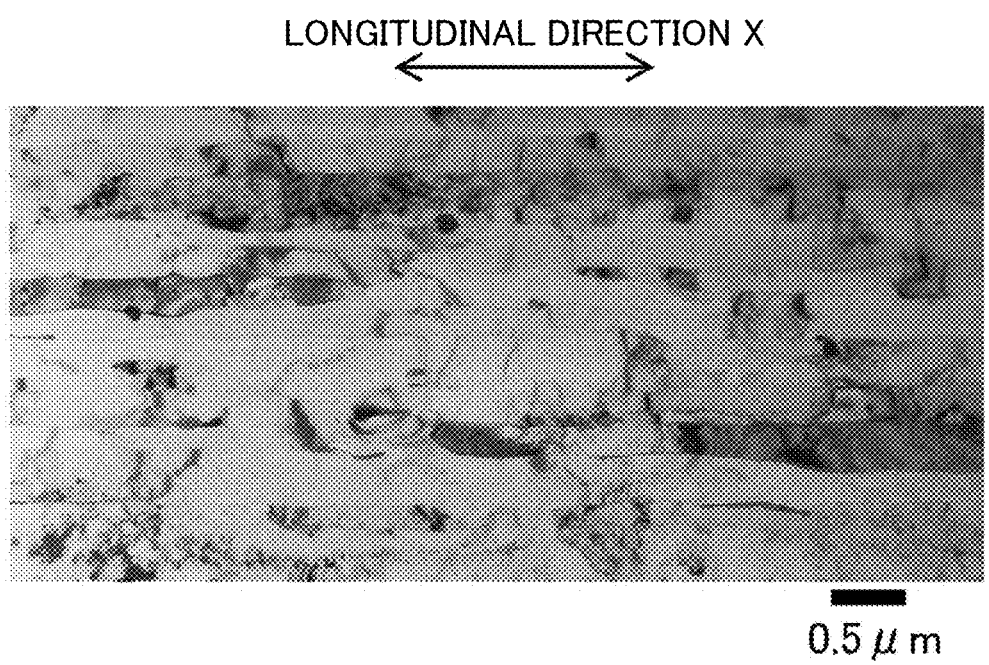
FIG. 5 is part of a TEM image of a cross section parallel to the longitudinal direction (wire drawing direction X) of a wire material photographed upon performing TEM observation.

Then, from the image photographed upon performing TEM observation, the presence/absence of a fibrous metallic microstructure was determined for a cross section parallel to the longitudinal direction (drawing direction X) of the wire material. FIG. 5 is part of a TEM image of a cross section parallel to the longitudinal direction (drawing direction X) of the wire material photographed upon performing TEM observation. In the Examples of the present invention, in the case of the metallic microstructure such as that shown in FIG. 5 being observed, a fibrous metallic microstructure was evaluated as "present".

Furthermore, any 100 among crystal grains in each observation field of view were selected, the maximum dimension t in the direction perpendicular to the longitudinal direction of each crystal grain and the dimension parallel to the longitudinal direction of the crystal grain were measured to calculate the aspect ratio of this crystal grain. Furthermore, for the maximum dimension t in the direction perpendicular to the longitudinal direction of the crystal grain and aspect ratio, the average values were calculated from the total of observed crystal grains. It should be noted that, in the case of the maximum dimension t in the direction perpendicular to the longitudinal direction of observed crystal grains being clearly larger than 400 nm, the selected number of crystal grains to measure each dimension was reduced, and the average value of each was calculated. In addition, for samples in which the dimension parallel to the longitudinal direction of crystal grains is clearly at least 10 times the maximum dimension t in a direction perpendicular to the longitudinal direction of crystal grains, they were determined as an aspect ratio of 10 or more in the same way.

(3) Average Value of Number of Specific Voids and Maximum Dimension in Direction Perpendicular to Longitudinal Direction of the Plurality of Specific Voids The measurement of the average value for the number of specific voids and the average value measurement for the maximum dimension in the direction perpendicular to the longitudinal direction of a plurality of specific voids were performed by FE-SEM (Field Emission Scanning Electron Microscopy) observation using a scanning electron microscope (JSM-7001FA manufactured by JEOL Ltd.). The acceleration voltage was observed at 25.0 kV.

As the observation sample, after filling the aluminum alloy material into the resin and curing this resin, machine polishing as done so that the cross section parallel to the longitudinal direction (drawing direction X) of the above-mentioned wire member was exposed, the exposed cross section was finished by ion milling, and the sample on which carbon was further vacuum deposited was used.

The observation field of view was defined as longitudinal direction (98 to 148) μm×thickness direction (73 to 110) μm, and observation was performed at a central part in the thickness direction on a line corresponding to the wire diameter direction (direction perpendicular to longitudinal direction) in the above-mentioned cross section, i.e. central position of two surfaces (position at the center by moving by about ½ of the wire diameter from the surface side). Similar observation was performed in a total of five fields of view randomly selected, and the average value for the number of specific voids and the average value for the maximum dimension in a direction perpendicular to the longitudinal direction of the specific voids were obtained.

Figure 6A:
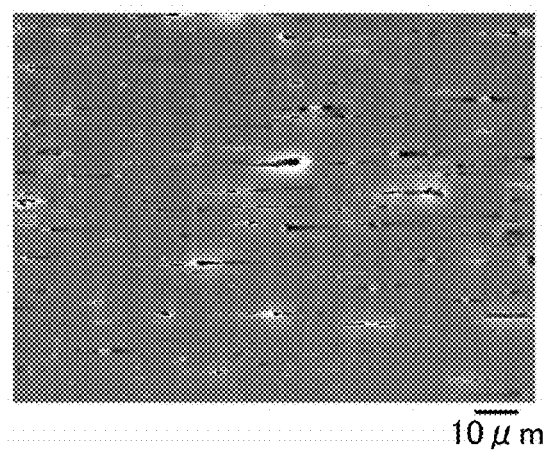
FIG. 6 is a part of an SEM image of a cross section parallel to the longitudinal direction (wire drawing direction X) of a wire material photographed upon performing FE-SEM observation of Comparative Example 10, with (a) being an SEM image capturing the whole field of view, (b) being an enlarged SEM image for explaining the measurement method of the number of specific voids, and (c) being an image attaching the existing locations of specific voids to the SEM image of (a)
Figure 6B:
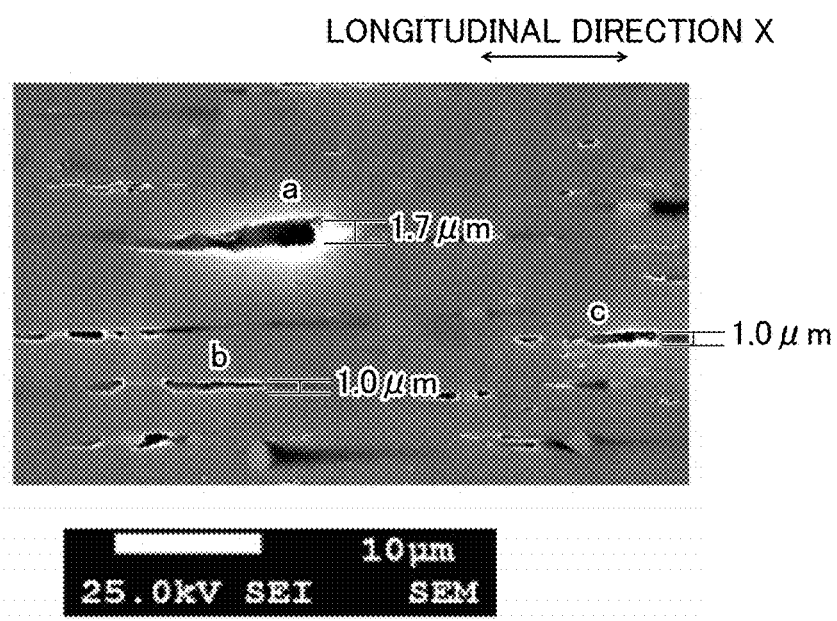
Figure 6C:
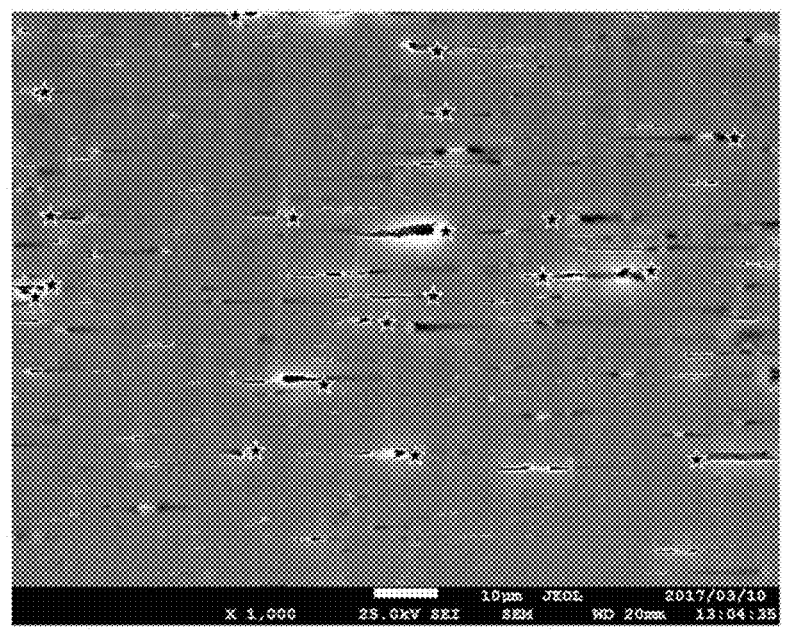
Figure 7:
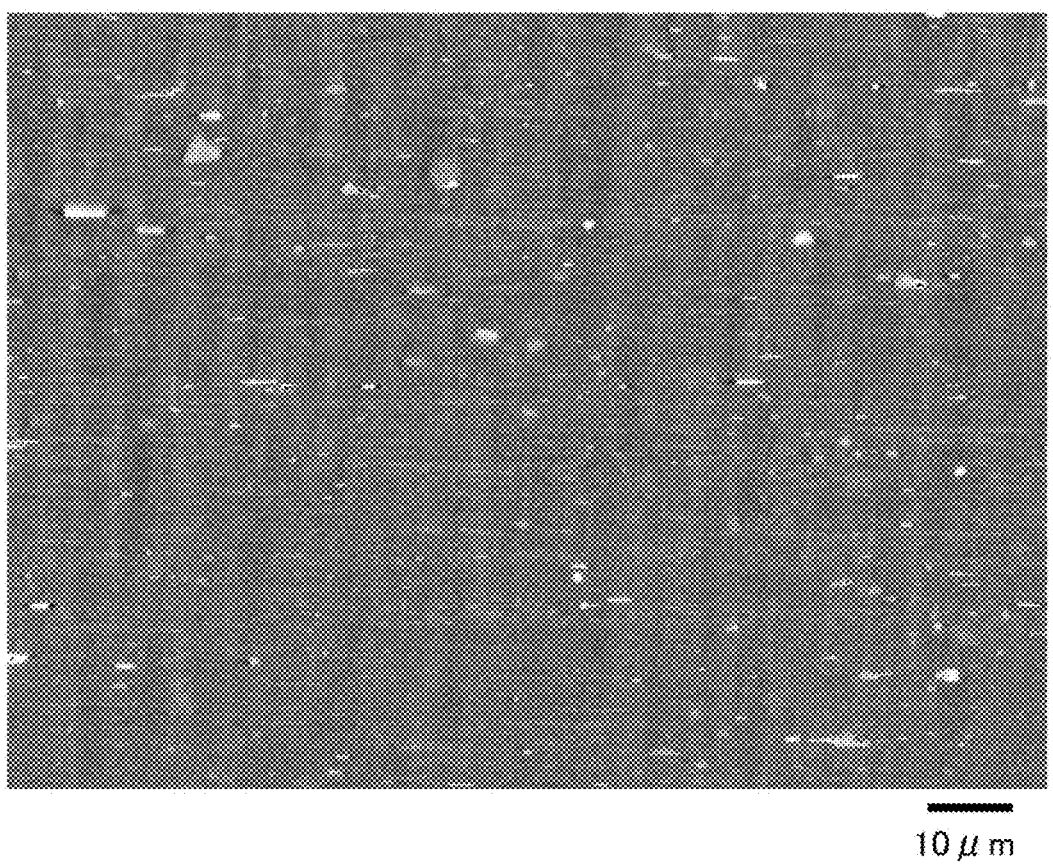
FIG. 7 is a part of an SEM image of a cross section parallel to the longitudinal direction (wire drawing direction X) of a wire photographed upon performing FE-SEM observation of Example 31 of the present invention.

Then, from the image photographed upon performing FE-SEM observation, the presence/absence of specific voids and number thereof, and the average number of the maximum dimension in a direction perpendicular to the longitudinal direction of the specific voids were measured in the cross section parallel to the longitudinal direction (drawing direction X) of the wire material. FIG. 6 is part of an SEM image of a cross section parallel to the longitudinal direction (drawing direction X) of wire material photographed upon performing FE-SEM observation of Comparative Example 10. From FIG. 6(a), specific voids having a maximum dimension in a direction perpendicular to the longitudinal direction (drawing direction X) of the wire material of at least 1.0 μm were confirmed. FIG. 6(b) is enlarging a part of this FIG. 6(a). In the specific void a of FIG. 6(b), the maximum dimension in a direction perpendicular to the longitudinal direction of the wire material (drawing direction X) is 1.7 μm, and in the specific voids b and c, the maximum dimension in a direction perpendicular to the longitudinal direction of the wire material (drawing direction X) is 1.0 μm. FIG. 6(c) is attaching stars (★) at the lateral positions of the specific voids having a maximum dimension in a direction perpendicular to the longitudinal direction (drawing direction X) of the wire material of at least 1.0 μm, in the field of view of FIG. 6(a). In the field of view of FIG. 6(a), 19 specific voids having a maximum dimension in a direction perpendicular to the longitudinal direction (drawing direction X) of the wire material of at least 1.0 μm were confirmed. FIG. 7 is part of an SEM image of a cross section parallel to the longitudinal direction (drawing direction X) of the wire material photographed upon performing FE-SEM observation of Example 31 of the present invention. In FIG. 7, specific voids having a size in a direction perpendicular to the longitudinal direction (drawing direction X) of the wire material of at least 1.0 μm were not confirmed.

(4) 0.2% Yield Strength (MPa) and Break Elongation

In accordance with JIS Z2241:2001, tensile testing was performed using a precision universal testing machine (manufactured by Shimadzu Corporation), and the 0.2% yield strength (MPa) and break elongation was measured. Only experiments in which breakage occurred between chucks were adopted, and the average value of n=4 was obtained thereamong. It was conducted at conditions of 100 mm for distance between marks, and deformation speed of 10 mm/min.

TABLE 2-1

| | | | | | Alloy composition (mass %) | | | | | |
| | | | | | At least one selected from Cu, Ag, Zn, Ni, Co, Au, Mn, Cr, V, Zr, Sn, Ti, B | | | | Al and inevitable | Manufacturing |
| | | Mg | Si | Fe | Component 1 | | Component 2 | | Component 3 | Total | impurities | condition |
|---|---|---|---|---|---|---|---|---|---|---|---|---|
| Example of present invention | 1 | 0.54 | 0.54 | 0.19 | — | | — | | — | — | Balance | A |
| | 2 | 0.54 | 0.54 | 0.19 | — | | — | | — | — | Balance | B |
| | 3 | 0.54 | 0.54 | 0.19 | — | | — | | — | — | Balance | C |
| | 4 | 0.54 | 0.54 | 0.19 | — | | — | | — | — | Balance | D |
| | 5 | 0.54 | 0.54 | 0.19 | — | | — | | — | — | Balance | E |
| | 6 | 0.54 | 0.54 | 0.19 | — | | — | | — | — | Balance | F |
| | 7 | 0.54 | 0.54 | 0.19 | — | | — | | — | — | Balance | G |
| | 8 | 0.54 | 0.54 | 0.19 | — | | — | | — | — | Balance | H |
| | 9 | 0.24 | 1.95 | 0.19 | — | | — | | — | — | Balance | F |
| | 10 | 0.22 | 0.22 | 0.19 | — | | — | | — | — | Balance | G |
| | 11 | 0.81 | 0.75 | 1.42 | — | | — | | — | — | Balance | B |
| | 12 | 0.91 | 0.88 | 0.15 | — | | — | | — | — | Balance | F |
| | 13 | 1.76 | 0.31 | 0.11 | — | | — | | — | — | Balance | F |
| | 14 | 1.76 | 1.85 | 0.11 | — | | — | | — | — | Balance | D |
| | 15 | 0.73 | 0.71 | 0.19 | Cu | 0.12 | — | | — | 0.12 | Balance | F |
| | 16 | 0.73 | 0.71 | 0.19 | Cu | 0.33 | Zr | 0.06 | — | 0.39 | Balance | G |
| | 17 | 0.73 | 0.71 | 0.19 | Cu | 1.21 | Ag | 0.71 | — | 1.92 | Balance | H |
| | 18 | 0.73 | 0.71 | 0.19 | Cu | 0.71 | Ni | 0.32 | — | 1.03 | Balance | C |
| | 19 | 0.73 | 0.71 | 0.19 | Mn | 0.12 | — | | — | 0.12 | Balance | F |
| | 20 | 0.73 | 0.71 | 0.19 | Cr | 0.22 | Sn | 0.05 | — | 0.27 | Balance | F |

TABLE 2-1-continued

| | | | | Alloy composition (mass %) | | | | | | | | |
|---|---|---|---|---|---|---|---|---|---|---|---|---|
| | | | | At least one selected from Cu, Ag, Zn, Ni, Co, Au, Mn, Cr, V, Zr, Sn, Ti, B | | | | | | | Al and inevitable | Manufacturing |
| | Mg | Si | Fe | Component 1 | | Component 2 | | Component 3 | | Total | impurities | condition |
| 21 | 0.73 | 0.71 | 0.19 | Zr | 0.13 | Cr | 0.08 | — | | 0.21 | Balance | G |
| 22 | 0.73 | 0.71 | 0.19 | Zn | 0.11 | Au | 0.06 | — | | 0.17 | Balance | A |
| 23 | 0.73 | 0.71 | 0.19 | Cr | 0.11 | Mn | 0.11 | — | | 0.22 | Balance | G |
| 24 | 0.20 | 1.95 | 0.11 | Co | 0.13 | V | 0.15 | — | | 0.28 | Balance | E |
| 25 | 0.22 | 0.22 | 0.15 | Cu | 0.53 | Cr | 0.07 | — | | 0.60 | Balance | F |
| 26 | 0.73 | 0.71 | 1.42 | Cu | 1.22 | Mn | 0.22 | — | | 1.44 | Balance | B |
| 27 | 0.91 | 0.88 | 0.15 | Cu | 0.07 | — | | — | | 0.07 | Balance | E |
| 28 | 0.98 | 0.60 | 0.07 | Cu | 0.28 | Cr | 0.14 | — | | 0.42 | Balance | F |
| 29 | 1.76 | 0.31 | 0.11 | Mn | 0.33 | Cr | 0.22 | — | | 0.55 | Balance | H |
| 30 | 1.76 | 1.82 | 0.19 | Cu | 1.22 | Cr | 0.14 | — | | 1.36 | Balance | D |
| 31 | 0.54 | 0.54 | 0.19 | Ti | 0.01 | B | 0.01 | — | | 0.02 | Balance | C |
| 32 | 0.73 | 0.71 | 0.19 | Ti | 0.01 | B | 0.01 | Cu | 1.21 | 1.23 | Balance | H |
| 33 | 0.41 | 0.63 | 0.21 | Ti | 0.01 | B | 0.01 | Mn | 0.37 | 0.09 | Balance | F |
| 34 | 0.59 | 0.48 | 0.16 | Ti | 0.01 | B | 0.01 | Zr | 0.35 | 0.07 | Balance | G |
| 35 | 0.51 | 0.53 | 0.11 | Ti | 0.01 | B | 0.01 | Ni | 0.14 | 0.16 | Balance | F |
| 36 | 0.58 | 0.61 | 0.21 | Ti | 0.02 | B | 0.01 | Cu | 0.04 | 0.07 | Balance | G |

TABLE 2-2

| | | Structure evaluation | | | | | Characteristic evaluation | |
|---|---|---|---|---|---|---|---|---|
| | | Presence/absence of fibrous metallic microstructure | Average value for maximum dimension t perpendicular to longitudinal direction of crystal grain (nm) | Number of specific voids (voids/10000 μm²) | Aspect ratio of crystal grain | Average value for maximum dimension a perpendicular to longitudinal direction of specific void (μm) | Average value of a/average value of t | 0.2% yield strength (MPa) | Elongation (%) |
| Example of present invention | 1 | Present | 330 | 1 | ≥10 | 1.30 | 3.94 | 410 | 4.2 |
| | 2 | Present | 220 | 3 | ≥10 | 1.20 | 5.45 | 470 | 3.5 |
| | 3 | Present | 160 | 2 | ≥10 | 0.90 | 5.63 | 570 | 2.8 |
| | 4 | Present | 100 | 3 | ≥10 | 1.10 | 11.00 | 670 | 2.2 |
| | 5 | Present | 340 | 2 | ≥10 | 1.30 | 3.82 | 370 | 7.3 |
| | 6 | Present | 210 | 1 | ≥10 | 1.10 | 5.24 | 430 | 6.5 |
| | 7 | Present | 160 | 2 | ≥10 | 1.10 | 6.88 | 530 | 4.1 |
| | 8 | Present | 90 | 3 | ≥10 | 0.90 | 10.00 | 620 | 3.2 |
| | 9 | Present | 260 | 1 | ≥10 | 0.80 | 3.08 | 400 | 4.6 |
| | 10 | Present | 190 | 3 | ≥10 | 0.90 | 4.74 | 480 | 3.8 |
| | 11 | Present | 170 | 2 | ≥10 | 1.60 | 9.41 | 520 | 3.1 |
| | 12 | Present | 190 | 1 | ≥10 | 1.10 | 5.79 | 420 | 6.4 |
| | 13 | Present | 160 | 1 | ≥10 | 1.20 | 7.50 | 470 | 5.2 |
| | 14 | Present | 80 | 2 | ≥10 | 0.90 | 11.25 | 700 | 2.2 |
| | 15 | Present | 180 | 3 | ≥10 | 1.20 | 6.67 | 440 | 5.4 |
| | 16 | Present | 130 | 3 | ≥10 | 1.30 | 10.00 | 540 | 4.5 |
| | 17 | Present | 80 | 9 | ≥10 | 1.10 | 13.75 | 640 | 2.8 |
| | 18 | Present | 150 | 1 | ≥10 | 1.20 | 8.00 | 580 | 2.4 |
| | 19 | Present | 180 | 2 | ≥10 | 0.80 | 4.44 | 430 | 6.8 |
| | 20 | Present | 160 | 1 | ≥10 | 0.80 | 5.00 | 440 | 6.3 |
| | 21 | Present | 140 | 0 | ≥10 | 1.10 | 7.86 | 520 | 5.3 |
| | 22 | Present | 310 | 1 | ≥10 | 1.86 | 6.00 | 420 | 4.3 |
| | 23 | Present | 150 | 2 | ≥10 | 1.30 | 8.67 | 540 | 5.2 |
| | 24 | Present | 310 | 1 | ≥10 | 4.71 | 15.23 | 380 | 7.4 |
| | 25 | Present | 190 | 2 | ≥10 | 1.10 | 5.79 | 460 | 6.3 |
| | 26 | Present | 170 | 13 | ≥10 | 1.50 | 8.82 | 490 | 3.2 |
| | 27 | Present | 280 | 1 | ≥10 | 0.80 | 2.86 | 410 | 7.5 |
| | 28 | Present | 170 | 1 | ≥10 | 0.90 | 5.29 | 450 | 6.2 |
| | 29 | Present | 70 | 2 | ≥10 | 0.42 | 6.00 | 640 | 2.6 |
| | 30 | Present | 60 | 11 | ≥10 | 0.48 | 8.00 | 710 | 2.1 |
| | 31 | Present | 150 | 2 | ≥10 | 1.30 | 8.67 | 570 | 2.8 |
| | 32 | Present | 80 | 9 | ≥10 | 0.80 | 10.00 | 640 | 2.8 |
| | 33 | Present | 190 | 1 | ≥10 | 1.10 | 5.79 | 440 | 6.1 |
| | 34 | Present | 150 | 2 | ≥10 | 1.10 | 7.33 | 540 | 3.8 |
| | 35 | Present | 190 | 1 | ≥10 | 1.20 | 6.32 | 440 | 6.2 |
| | 36 | Present | 150 | 2 | ≥10 | 1.30 | 8.67 | 540 | 4.5 |

TABLE 2-3

| | | Alloy composition (mass %) | | | | | | | |
|---|---|---|---|---|---|---|---|---|---|
| | | Mg | Si | Fe | \multicolumn{4}{c|}{At least one selected from Cu, Ag, Zn, Ni, Cc, Au, Mn, Cr, V, Zr, Sn, Ti, B} | Al and inevitable impurities | Manufacturing condition |
| | | | | | Component 1 | Component 2 | Component 3 | Total | | |
| Comparative Example | 1 | — | — | — | — | — | — | — | Balance | C |
| | 2 | 0.16 | 0.15 | 0.19 | — | — | — | — | Balance | A |
| | 3 | 1.82 | 2.11 | 0.21 | Cu 0.12 | — | — | 0.12 | Balance | J:Wire breakage |
| | 4 | 0.91 | 0.88 | 1.62 | Cu 0.12 | — | — | 0.12 | Balance | J:Wire breakage |
| | 5 | 0.73 | 0.71 | 0.28 | Cu 1.81 | Zr 0.28 | — | 2.09 | Balance | J:Wire breakage |
| | 6 | 0.54 | 0.54 | 0.19 | — | — | — | — | Balance | K |
| | 7 | 0.73 | 0.71 | 0.19 | Cu 0.12 | — | — | 0.12 | Balance | K |
| | 8 | 0.54 | 0.54 | 0.19 | — | — | — | — | Balance | L: Wire breakage |
| | 9 | 0.73 | 0.71 | 0.19 | Cu 0.12 | — | — | 0.12 | Balance | L:Wire breakage |
| | 10 | 0.54 | 0.54 | 0.19 | — | — | — | — | Balance | M |
| | 11 | 0.73 | 0.71 | 0.19 | Cu 0.12 | — | — | 0.12 | Balance | M |
| | 12 | 0.54 | 0.54 | 0.19 | — | — | — | — | Balance | N:Wire breakage |
| | 13 | 0.73 | 0.71 | 0.19 | Cu 0.12 | — | — | 0.12 | Balance | N:Wire breakage |
| | 14 | 1.03 | 0.90 | 0.20 | Cu 0.16 | Cr 0.15 | — | 0.31 | Balance | O:Wire breakage |
| | 15 | 0.90 | 0.80 | 0.20 | Cu 1.30 | — | — | 1.30 | Balance | P:Wire breakage |
| | 16 | 0.42 | 0.80 | 0.10 | Mn 0.10 | — | — | 0.10 | Balance | Q |
| | 17 | 0.60 | 0.30 | 0.05 | — | — | — | — | Balance | R |
| | 18 | 0.60 | 0.60 | 0.50 | Cu 0.20 | Ti 0.02 | — | 0.22 | Balance | S |
| | 19 | 0.60 | 0.60 | 0.30 | — | — | — | — | Balance | T |

(Note)
Underline Table indicates being outside of suitable range of present invention, or low characteristic evaulation

TABLE 2-4

| | | \multicolumn{8}{c|}{Structure evaluation} | | |
|---|---|---|---|---|---|---|---|---|---|
| | | Presence/ absence of fibrous metallic microstructure | Average value for maximum dimension t perpendicular to longitudinal direction of crystal grain (nm) | Number of specific voids (voids/ 10000 μm²) | Aspect ratio of crystal grain | Average value for maximum dimension a perpendicular to longitudinal direction of specific void (μm) | Average value of a/ average value of t | 0.2% yield strength (MPa) | Elongation (%) |
| Comparative Example | 1 | Absent | 800 | 0 | 5 | 0.00 | 0.00 | 130 | 1.3 |
| | 2 | Present | 420 | 1 | ≥10 | 1.50 | 3.57 | 330 | 3.4 |
| | 3 | — | — | — | — | — | — | — | — |
| | 4 | — | — | — | — | — | — | — | — |
| | 5 | — | — | — | — | — | — | — | — |
| | 6 | Present | 440 | 2 | ≥10 | 1.60 | 3.64 | 300 | 7.5 |
| | 7 | Present | 420 | 2 | ≥10 | 1.50 | 3.57 | 310 | 7.1 |
| | 8 | — | — | — | — | — | — | — | — |
| | 9 | — | — | — | — | — | — | — | — |
| | 10 | Present | 100 | 19 | ≥10 | 2.10 | 21.00 | 650 | 1.4 |
| | 11 | Present | 80 | 19 | ≥10 | 1.80 | 22.50 | 670 | 1.2 |
| | 12 | — | — | — | — | — | — | — | — |
| | 13 | — | — | — | — | — | — | — | — |
| | 14 | — | — | — | — | — | — | — | — |
| | 15 | — | — | — | — | — | — | — | — |
| | 16 | Absent | 20000 | 5 | 2 | 1.80 | 0.09 | 150 | 14.5 |
| | 17 | Absent | 500 | 3 | ≥10 | 1.60 | 3.20 | 260 | 3.2 |
| | 18 | Present | 300 | 24 | ≥10 | 1.60 | 3.33 | 550 | 1.4 |
| | 19 | Present | 300 | 21 | ≥10 | 1.70 | 3.67 | 380 | 1.7 |

(Note)
Underline in Table indicates being outside of suitable range of present invention, or low characteristic evaluation From the evaluation results of Tables 2-2 and 2-4, with the aluminum alloy wire materials of Examples 1 to 36 of the present invention, the alloy composition is within the suitable range of the present invention, and has a fibrous metallic microstructure in which the crystal grains extend so as to align in one direction, and the average value of the maximum dimension in a direction perpendicular to the longitudinal direction of the crystal grains is no more than 400 nm, and in the case of observing a range of 10000 μm² of the central part in the thickness direction of the aluminum alloy material in a cross section parallel to the longitudinal direction, the number of specific voids having a maximum dimension in a direction perpendicular to the longitudinal direction of at least 1.0 μm was confirmed to be no more than 15.

By having such a unique metallic microstructure, the aluminum alloy wire materials according to Examples 1 to 36 of the present invention all have a 0.2% yield strength of at least 370 MPa, and break elongation of at least 2.1% to 7.5%.

In contrast, the pure aluminum wire material of Comparative Example 1 has a composition outside the suitable range of the present invention, and the average value of the maximum dimension t in a direction perpendicular to the longitudinal direction of crystal grains is larger than 400 nm; therefore, 0.2% yield strength and break elongation were poor.

For the aluminum alloy wire material of Comparative Example 2, since the contents of Mg and Si were smaller than the suitable ranges of the present invention, the crystals were not fined, the average value of the maximum dimension t in a direction perpendicular to the longitudinal direction of crystal grains was larger than 400 nm, and the 0.2% yield strength was poor.

For the aluminum alloy of Comparative Example 3, since the contents of Mg and Si were greater than the suitable range of the present invention, crystallized product precipitated, and wire breakage frequently occurred in cold drawing (2).

For the aluminum alloy of Comparative Example 4, since the content of Fe was greater than the suitable range of the present invention, Fe-based compound precipitated, and wire breakage frequently occurred in cold drawing (2).

For the aluminum alloy of Comparative Example 5, since the content of metal elements (optional added components) other than Mg, Si, Fe and Al was greater than the suitable range of the present invention, crystallized product precipitated, and wire breakage frequently occurred in cold drawing (2).

Although the aluminum alloy wire materials of Comparative Examples 6 and 7 have alloy compositions within a suitable range of the present invention, since the processing degree was lower than the suitable range of the present invention, the average value of the dimension t perpendicular to the longitudinal direction of crystal grains was larger than 400 nm, and the 0.2% yield strength was poor.

Although the aluminum alloy wire materials of Comparative Examples 8 and 9 have alloy compositions within a suitable range of the present invention, since interfacial strength enhancing heat treatment (1) was not performed, wire breakage frequently occurred upon cold drawing (2).

Although the aluminum alloy wire materials of Comparative Examples 10 and 11 have alloy compositions within a suitable range of the present invention, since the temperature of heat treatment performed prior to cold drawing (2) was high, the number of specific voids was greater than the suitable range of the present invention, and the break elongation was poor.

Although the aluminum alloy wire materials of Comparative Examples 12 and 13 have alloy compositions within a suitable range of the present invention, since the temperature of heat treatment performed prior to cold drawing (2) was low, wire breakage frequently occurred upon cold drawing (2).

Although the aluminum alloy wire materials of Comparative Examples 14 and 15 have alloy compositions within a suitable range of the present invention, wire breakage frequently occurred upon wire drawing.

Although the aluminum alloy wire materials of Comparative Examples 16 and 17 have alloy compositions within a suitable range of the present invention, since the average value of the maximum dimension t in a direction perpendicular to the longitudinal direction of crystal grains was larger than 400 nm, the 0.2% yield strength was poor.

Although the aluminum alloy wire materials of Comparative Examples 18 and 19 have alloy compositions within a suitable range of the present invention, the number of specific voids was greater than the suitable range of the present invention, and the break elongation was poor.

EXPLANATION OF REFERENCE NUMERALS 1 aluminum alloy material
10 crystal grain
t maximum dimension in direction perpendicular to longitudinal direction of crystal grains
X longitudinal direction of crystal grain

The invention claimed is:

1. An aluminum alloy material comprising an alloy composition containing 0.20 to 1.80 mass % of Mg, 0.20 to 2.00 mass % of Si, and 0.01 to 1.50 mass % of Fe, with a balance being Al and inevitable impurities,
wherein the aluminum alloy material has a fibrous metallic microstructure in which a plurality of crystal grains extend so as to be aligned in one direction, and
wherein, in a cross section parallel to the one direction, an average value of a maximum dimension in a direction perpendicular to the longitudinal direction of a plurality of the crystal grains is no more than 400 nm, and
viewing the cross section in a thickness direction, when observing at a central part, specific voids having a maximum dimension in a direction perpendicular to the longitudinal direction of no less than 1.0 μm are not present, or an existence number of the specific voids is no more than 15 per 10000 μm².

2. The aluminum alloy material according to claim 1, wherein the average value of the maximum dimension in the direction perpendicular to the longitudinal direction of the plurality of the specific voids is 4 to 15, relative to the average value of the maximum dimension in the direction perpendicular to the longitudinal direction of the plurality of the crystal grains.

3. The aluminum alloy material according to claim 2, wherein a surface is coated with at least one metal selected from the group consisting of Cu, Ni, Ag, Sn, Au, Pd and Pt.

4. The aluminum alloy material according to claim 1, wherein a surface is coated with at least one metal selected from the group consisting of Cu, Ni, Ag, Sn, Au, Pd and Pt.

5. A conductive member comprising the aluminum alloy material according to claim 1.

6. A battery member comprising the aluminum alloy material according to claim 1.

7. A fastening component comprising the aluminum alloy material according to claim 1.

8. A spring component comprising the aluminum alloy material according to claim 1.

9. A structural component comprising the aluminum alloy material according to claim 1.

10. A cabtire cable comprising the aluminum alloy material according to claim 1.

11. An aluminum alloy material comprising an alloy composition containing 0.20 to 1.80 mass % of Mg, 0.20 to 2.00 mass % of Si, 0.01 to 1.50 mass % of Fe, and no more than 2.00 mass % in total of at least one element selected from the group consisting of RE, Cu, Ag, Zn, Ni, Co, Au, Mn, Cr, V, Zr, Sn, Ti and B, with a balance being Al and inevitable impurities,
wherein the aluminum alloy material has a fibrous metallic microstructure in which a plurality of crystal grains extend so as to be aligned in one direction, and
wherein, in a cross section parallel to the one direction, an average value of a maximum dimension in a direction perpendicular to the longitudinal direction of a plurality of the crystal grains is no more than 400 nm, and
viewing the cross section in a thickness direction, when observing at a central part, specific voids having a maximum dimension in a direction perpendicular to the longitudinal direction of no less than 1.0 µm are not present, or an existence number of the specific voids is no more than 15 per 10000 µm².

12. The aluminum alloy material according to claim 11, wherein the average value of the maximum dimension in the direction perpendicular to the longitudinal direction of the plurality of the specific voids is 4 to 15, relative to the average value of the maximum dimension in the direction perpendicular to the longitudinal direction of the plurality of the crystal grains.

13. The aluminum alloy material according to claim 11, wherein a surface is coated with at least one metal selected from the group consisting of Cu, Ni, Ag, Sn, Au, Pd and Pt.

14. A conductive member comprising the aluminum alloy material according to claim 11.

15. A battery member comprising the aluminum alloy material according to claim 11.

16. A fastening component comprising the aluminum alloy material according to claim 11.

17. A spring component comprising the aluminum alloy material according to claim 11.

18. A structural component comprising the aluminum alloy material according to claim 11.

19. A cabtire cable comprising the aluminum alloy material according to claim 11.

* * * * *